(12) United States Patent
Aijaz

(10) Patent No.: US 11,564,123 B2
(45) Date of Patent: Jan. 24, 2023

(54) VIRTUAL TIME-SENSITIVE NETWORKING BRIDGE OVER A 5G WIRELESS SYSTEM

(71) Applicant: Kabushiki Kaisha Toshiba, Tokyo (JP)

(72) Inventor: Adnan Aijaz, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 93 days.

(21) Appl. No.: 17/038,896

(22) Filed: Sep. 30, 2020

(65) Prior Publication Data
US 2022/0104062 A1 Mar. 31, 2022

(51) Int. Cl.
*H04W 28/02* (2009.01)
*H04W 72/04* (2009.01)
*H04W 72/12* (2009.01)

(52) U.S. Cl.
CPC ... *H04W 28/0268* (2013.01); *H04W 72/0446* (2013.01); *H04W 72/1236* (2013.01); *H04W 72/1242* (2013.01)

(58) Field of Classification Search
None
See application file for complete search history.

(56) References Cited

U.S. PATENT DOCUMENTS

| | | | |
|---|---|---|---|
| 2018/0132234 A1 | 5/2018 | Cavalcanti et al. | |
| 2018/0324631 A1* | 11/2018 | Jheng | H04W 28/0268 |
| 2020/0112975 A1* | 4/2020 | Moon | H04W 8/04 |
| 2020/0304429 A1* | 9/2020 | Marcé | H04L 49/90 |
| 2021/0006359 A1* | 1/2021 | Murayama | H04W 60/00 |

(Continued)

FOREIGN PATENT DOCUMENTS

| | | | |
|---|---|---|---|
| WO | WO2018203923 | * | 9/2017 |
| WO | WO2019072397 | * | 10/2017 |
| WO | WO2021060936 | * | 9/2020 |

OTHER PUBLICATIONS

Aijaz et al., "The Tactile Internet for Industries: A Review", *Proceedings of the IEEE*, vol. 107, No. 2, Feb. 2019, 22 pages.
(Continued)

*Primary Examiner* — Mohammad S Adhami
(74) *Attorney, Agent, or Firm* — Oblon, McClelland, Maier & Neustadt, L.L.P.

(57) ABSTRACT

Arrangements described herein allow integration of TSN and wireless systems (e.g. 5G systems) by forming a virtual bridge over the wireless system. A two-level scheduling scheme is provided, where data is mapped into separate virtual queues based on the respective priority of the data. Each virtual queue is given a permission to allocate transmission resources (e.g. timeslots) at certain windows in accordance with a schedule. During each window, transmission resources are then allocated for the respective queue from a set of transmission resources. By applying two levels of scheduling (scheduling when to schedule), different scheduling rules can be applied for different priority data (different virtual queues). In addition, higher priority data can be scheduled with a higher priority (e.g. before the scheduling of lower priority data). This allows minimum performance criteria for certain types of data (certain Quality of Service data flows) to be guaranteed across the wireless system.

20 Claims, 25 Drawing Sheets

(56) References Cited

U.S. PATENT DOCUMENTS

2022/0046462 A1\* 2/2022 De Andrade Jardim ..................... H04L 47/2416
2022/0086681 A1\* 3/2022 Kwok ................... H04W 80/08

OTHER PUBLICATIONS

Aijaz, "Packet Duplication in Dual Connectivity Enabled 5G Wireless Networks: Overview and Challenges", *IEEE Communications Standards Magazine*, vol. 3, No. 3, Sep. 2019, 9 pages.

Farkas et al., "5G-TSN integration meets networking requirements for Industrial Automation; 5G-TSN Integration for Industrial Automation", Ericsson Technology Review, Aug. 27, 2019, https://www.ericsson.com/4a4cb4/assets/local/reports-papes/ericsson-technology-review/docs/2019/5g-tsn-integration-for-industrial-automation.pdf, 11 pages.

\* cited by examiner

VIRTUAL TIME-SENSITIVE NETWORKING BRIDGE OVER A 5G WIRELESS SYSTEM

TECHNICAL FIELD

The present disclosure relates to methods, devices and systems for scheduling transmissions over a wireless system forming a virtual bridge between a first time-sensitive networking (TSN) system and a second TSN system. In particular, but without limitation, this disclosure relates to providing quality of service (QoS) data flows within a wireless system to provide high reliability and bounded and deterministic end-to-end latency to allow integration of wireless systems with time-sensitive networking.

BACKGROUND

Time-sensitive networking (TSN) is a set of standards under development within the IEEE 802.1 working group to improve the real-time capabilities of standard Ethernet. TSN provides guaranteed data delivery with deterministic and bounded latency and extremely low data loss. TSN supports both time-critical and best-effort traffic over a single standard Ethernet network. TSN includes various standards, which can be grouped into time synchronization, ultra-high reliability, bounded low latency, and resource management. TSN finds applications in systems where very low latency is important, such as real-time audio/video streaming and real-time control systems.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Figure 1:
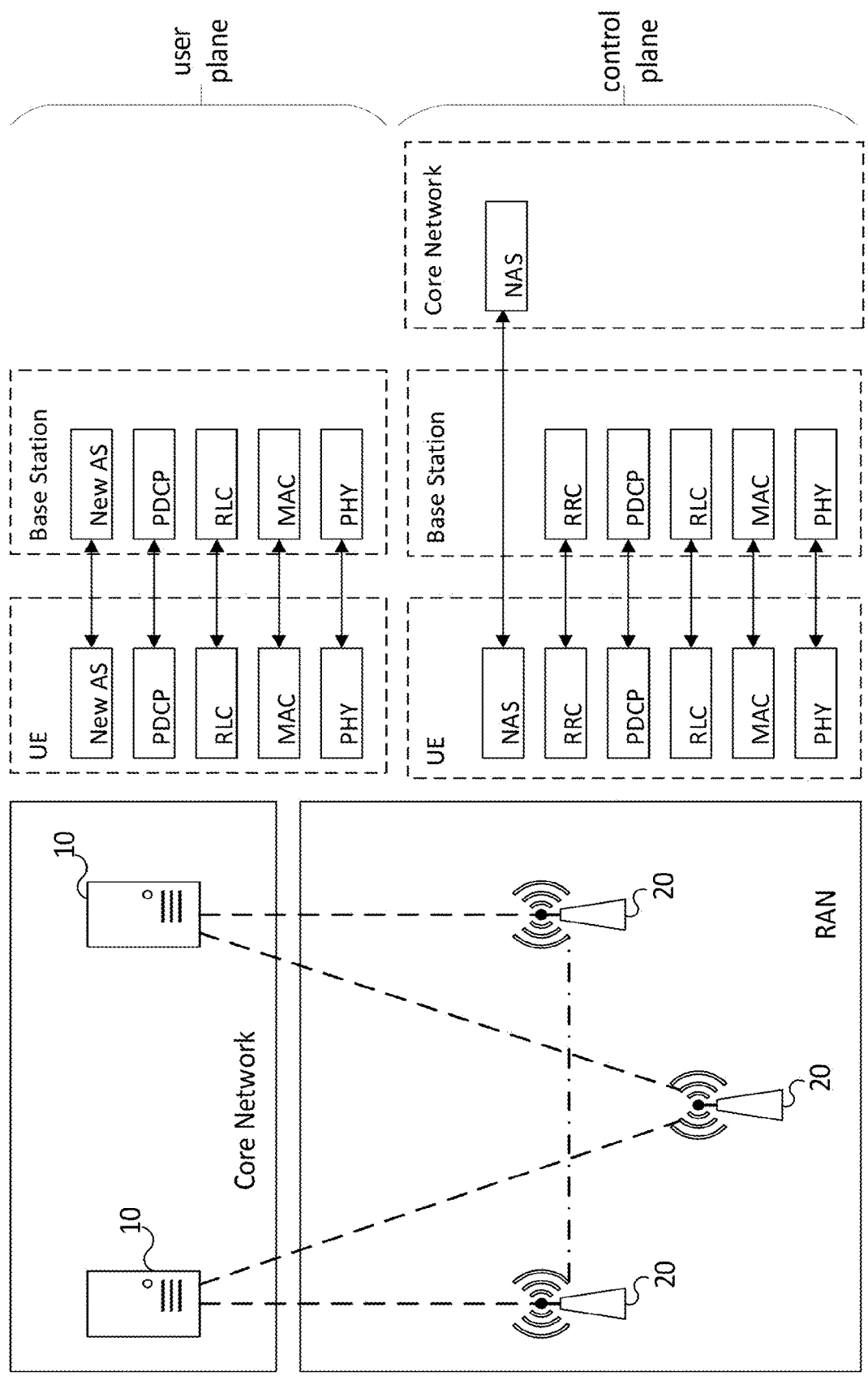
FIG. 1 shows a network and protocol stack for use with the implementations described herein.

Arrangements described herein allow integration of TSN and wireless systems (e.g. 5G systems) by forming a virtual bridge over the wireless system. A two-level scheduling scheme is provided, where data is mapped into separate virtual queues based on the respective priority of the data. Each virtual queue is given a permission to allocate transmission resources (e.g. timeslots) at certain windows in accordance with a schedule. During each window, transmission resources are then allocated for the respective queue from a set of transmission resources. By applying two levels of scheduling (scheduling when to schedule), different scheduling rules can be applied for different priority data (different virtual queues). In addition, higher priority data can be scheduled with a higher priority (e.g. before the scheduling of lower priority data). This allows minimum performance criteria for certain types of data (certain Quality of Service data flows) to be guaranteed across the wireless system.

Importantly the schedule that provides access to the virtual windows need not be linked to the end allocation of transmission resources (the transmission schedule), in that even though the scheduling of a first virtual queue occurs before that of a second virtual queue, the transmission of data from the first virtual queue may actually occur after the transmission of the data from the second virtual queue (depending on how the transmission resources are allocated). This provides additional flexibility. A variety of transmission resource allocation rules are provided to enable higher priority data to take priority over lower priority data. This is important to ensure determinism for certain quality of service (QoS) data flows, such as those dedicated to control purposes.

According to a first arrangement there is provided a computer-implemented method for scheduling transmissions over a wireless system forming a virtual bridge between a first time-sensitive networking, TSN, system and a second TSN system, the method comprising: receiving data for transmission from the first TSN system at an ingress port of the wireless system; classifying different portions of the data for transmission into different quality of service, QoS, data flows based on relative priority of the portions of the data; dividing the QoS data flows into a plurality of subsets of one or more QoS data flows, and allocating each subset of one or more QoS data flows to a corresponding virtual queue, each virtual queue including the data for the corresponding subset of one or more QoS data flows; obtaining a schedule including a set of windows wherein each window provides permission to a corresponding virtual queue to access and allocate transmission resources for transmitting data in the queue; applying the schedule in order to allocate, for each window, transmission resources for the corresponding virtual queue from a set of transmission resources; and transmitting the data across the wireless system using the allocated resources; and outputting the data to the second TSN system at an egress port of the wireless system.

The wireless system may be a wireless mobile telecommunication network (e.g. a cellular network). The wireless system may be a 5G network comprising a user equipment, a radio access network and a user-plane function. The virtual bridge may provide a logical bridge that can provide similar functionality to a physical TSN bridge (which is typically reserved for Ethernet connections).

The allocation of transmission resources applies rules that are independent from the schedule. That is, the data from the virtual queues need not be transmitted in the order specified by the schedule. Instead, the schedule determines the order by which virtual queues gain permission to allocate transmission resources. The set of transmission resources may be shared across all virtual queues, although virtual queues that gain access to the resources after other queues may be limited to allocate previously unallocated resources. In this regard, virtual queues that gain access to the set of transmission resources at an earlier time may have access to a greater proportion of the set of transmission resources, thereby allowing more optimised transmission scheduling. Furthermore, one or more virtual queues may be provided permission to transmit all of the data currently in their virtual queue within the set of available transmission resources, whilst other virtual queues may be then provided a share of the remaining resources to be shared between multiple remaining virtual queues. Nevertheless, a minimum amount or proportion of transmission resources may be reserved for each virtual queue to ensure that no virtual queue.

According to an arrangement, the transmission resources are allocated such that the transmission of one or more higher priority QoS data flows is prioritized over one or more lower priority QoS data flows. A higher priority QoS data flow may relate to data with a priority above a given priority threshold. A lower priority QoS data flows may relate to data with a priority above a given priority threshold. Priority could be determined in accordance with a predefined priority value or a classification for the respective QoS data flows based on one or more predefined classification rules.

Specific transmission resources within the set of transmission resources may be reserved for the transmission of the one or more higher priority QoS data flows. The set of transmission resources may relate to a predefined cycle time for transmission. One or more specific time windows (e.g. one or more specific sets of time slots) may be reserved in each cycle for one or more corresponding virtual queues (e.g. one or more higher priority QoS data flows). The remaining transmission resources (e.g. remaining non-reserved time slots) may then be divided between the other virtual queues.

According to an arrangement, the first TSN system, the second TSN system and the wireless system are each one hop within a multi-hop network, transmission across the multi-hop network is scheduled in predefined cycles, and the set of transmission resources relates to a single cycle for one hop of transmission across the wireless system.

A timing guarantee may be applied that ensures all data relating to one or more virtual queues is sent within one cycle of receipt. These one or more virtual queues may be higher priority virtual queues. The remaining virtual queues (e.g. relating to lower priority traffic) might be sent over longer period (e.g. over multiple cycles).

The wireless system may employ a plurality of protocol layers, with the virtual queues extending across multiple of these layers. For instance, the virtual queue may extend across a number of layers above a medium access control layer. The virtual queue may extend across a Packet Data Convergence Protocol layer and a radio link control layer. This allows data to be treated differently by these layers according to the relative priority of the data (as defined by the virtual queues).

According to an arrangement, the transmission resources are selected from a set of timeslots over a predefined transmission cycle, and the transmission of one or more higher priority QoS data flows is prioritized over one or more lower priority QoS data flows by one or more of: reserving a predefined group of one or more timeslots for the one or more higher priority QoS data flows; and allocating timeslots in order of priority.

According to an arrangement, each virtual queue is allocated to a corresponding radio bearer for transmission. A radio bearer may be a logical channels for transmission over the wireless system, e.g. between a user equipment and a radio access network. The radio bearers may be data radio bearers.

According to an arrangement, a QoS data flow is allocated to a dedicated virtual queue in response the QoS data flow being a higher priority QoS data flow and one or more of the following conditions being satisfied: an amount or proportion of lost packets for the QoS data flow exceeds a packet loss threshold; and a remaining transmission budget left for transmitting data within a predefined transmission window is less than a transmission budget threshold.

According to an arrangement the packet loss threshold or transmission budget threshold varies depending on the priority of the QoS data flow. For instance, higher priority QoS data flows may be allocated a lower packet loss threshold and/or a higher transmission budget threshold than lower priority QoS data flows.

According to an arrangement multiple QoS data flows are allocated to a shared virtual queue in response to each of the multiple QoS data flows being lower priority data flows.

According to an arrangement allocating, for each window, transmission resources for the corresponding virtual queue from a set of transmission resources comprises: forming a higher priority data unit reserved for a higher virtual queue and one or more lower priority data units for a plurality of lower virtual queues; scheduling transmission for the higher priority data unit in a corresponding transmission window reserved for the higher priority virtual queue; and scheduling transmission for the one or more lower priority data units across one or more remaining transmission windows. A transmission window may be a time slot.

According to an arrangement the one or more lower priority data units each comprise data taken from each of the plurality of lower priority virtual queues.

According to an arrangement scheduling transmission for the one or more lower priority data units across one or more remaining windows comprises, for each lower priority virtual queue, scheduling transmission for the corresponding lower priority data unit in a corresponding transmission window reserved for the lower priority queue.

According to an arrangement allocating, for each window, transmission resources for the corresponding virtual queue from a set of transmission resources comprises: forming a set of data units from the data in the virtual queues; for each data unit that contains higher priority data: determining whether a predefined transmission budget is left within the set of transmission resources; and: if so, scheduling the data unit in a previously unallocated time window; and if not, scheduling the data unit in a prioritized time window that can pre-empt a previously scheduled transmission. The previously scheduled transmission may relate to a data unit that does not contain higher priority data.

According to an arrangement allocating, for each window, transmission resources for the corresponding virtual queue from a set of transmission resources further comprises: for each data unit that does not contain higher priority data, determining if there is a previously unallocated time window and: if so, scheduling the data unit in the previously unallocated time window; and if not, deferring transmission of the data unit for a later set of transmission resources.

According to an arrangement each QoS data flow is associated with a corresponding QoS profile that specifies one or more transmission parameters for the QoS data flow, wherein the one or more transmission parameters comprises one or more of: an acceptable latency specifying a latest time that data can be received at the egress port to ensure that the data is output at the egress port by a predefined time; and a loss tolerance specifying a maximum number or proportion of lost packets for the QoS profile.

A QoS indicator may be allocated to each QoS data flow for identifying the QoS flow to allow different treatment for different data types. This allows performance criteria to be maintained for certain (e.g. high priority) QoS flows.

The acceptable latency may be an acceptable latency range (e.g. comprising an earliest time that data can be received at the egress port). The acceptable latency may specify a range of delays that would be acceptable across the wireless system whilst still ensuring a predefined timing guarantee (e.g. control data is output by the predefined time, such as where the predefined time is the end of one cycle). The acceptable latency may be specified by an egress delay minimum and/or an egress delay maximum. The egress delay minimum may specify the earliest possible time instant at which a packet can arrive at the egress port relative to its arrival at the ingress port of the wireless system. The egress delay maximum may specify the latest possible time instant at which a packet can arrive at the egress port relative to its arrival at the ingress port of the wireless system. Loss tolerance may be the number or proportion of packet losses that can be tolerated for a given QoS data flow.

According to an arrangement the one or more transmission parameters comprises both the acceptable latency range and the loss tolerance; and the wireless system drops the transmission of a packet for a given QoS data flow in response to a latency of the packet falling outside of the acceptable latency range provided that a current number or proportion of lost packets for the given QoS data flow is within the loss tolerance for the QoS data flow.

According to an arrangement the one or more transmission parameters comprises both the acceptable latency range and the loss tolerance; and the wireless system reschedules a packet with a higher priority in response to a latency of the packet falling outside of the acceptable latency range and a current number or proportion of lost packets for the given QoS data flow exceeding the loss tolerance for the QoS data flow.

According to an arrangement a packet buffer located at the egress port of the wireless system stores incoming packets and forwards these based on arrival time requirements at the egress port.

According to a second arrangement there is provided a wireless system for forming a virtual bridge between a first time-sensitive networking, TSN, system and a second TSN system, the wireless system comprising: an ingress port configured to receive data for transmission from the first TSN system; a wireless network configured to: classify different portions of the data for transmission into different quality of service, QoS, data flows based on relative priority of the portions of the data; divide the QoS data flows into a plurality of subsets of one or more QoS data flows, and allocating each subset of one or more QoS data flows to a corresponding virtual queue, each virtual queue including the data for the corresponding subset of one or more QoS data flows; obtain a schedule including a set of windows wherein each window provides permission to a corresponding virtual queue to access and allocate transmission resources for transmitting data in the queue; apply the schedule in order to allocate, for each window, transmission resources for the corresponding virtual queue from a set of transmission resources; and transmit the data across the wireless network using the allocated resources; and an egress port configured to output the data transmitted over the wireless network to the second TSN system.

According to an arrangement the wireless network comprises a mobile device, one or more base stations and a core network, wherein the mobile device and the one or more base stations are configured to communicate wirelessly with each other, wherein the core network is configured to transfer data to and from the one or more base stations.

The wireless system may be a 5G wireless network comprising a user equipment, a radio access network and a user plane function.

According to a third arrangement there is provided a device for scheduling transmissions over a wireless system forming a virtual bridge between a first time-sensitive networking, TSN, system and a second TSN system, the device comprising a processor configured to: receive data for transmission from the first TSN system; classify different portions of the data for transmission into different quality of service, QoS, data flows based on relative priority of the portions of the data; divide the QoS data flows into a plurality of subsets of one or more QoS data flows, and allocating each subset of one or more QoS data flows to a corresponding virtual queue, each virtual queue including the data for the corresponding subset of one or more QoS data flows; obtaining a schedule including a set of windows wherein each window provides permission to a corresponding virtual queue to access and allocate transmission resources for transmitting data in the queue; and apply the schedule in order to allocate, for each window, transmission resources for the corresponding virtual queue from a set of transmission resources.

The device may be a mobile device (user equipment) or a base station (e.g. forming part of a radio access network). The device may also comprise an antenna and may be configured to transmit the data using the allocated transmission resources.

Time-sensitive networking (TSN) is a set of standards under development within the IEEE 802.1 working group to improve the real-time capabilities of standard Ethernet. TSN is expected to be the de-facto wired technology for industrial communication. It is likely to co-exist with high-performance wireless technologies like 5G. Therefore, integration of TSN and 5G is crucial in the envisioned digital transformation of industrial systems. Such integration provides end-to-end deterministic connectivity leading to various design simplifications in industrial automation networks while enabling unprecedented new applications. However, such integration and converged operation of TSN and high-performance wireless networking also creates various challenges.

Two main approaches for tight integration of 5G and TSN systems are available without adapting the 5G methodology. In the first solution, a 5G system appears as a TSN link, i.e., as an Ethernet cable which would have to be plugged into the TSN bridge. However, there is a fundamental mismatch of the link between wired and wireless communication. This can be addressed through either pre-configuration of TSN capabilities in a 5G system or enhancements to TSN standards for supporting a 5G system link. In the second solution, the 5G system appears as a virtual TSN bridge or a black box for integration with TSN. From TSN perspective, no modifications are necessary and the 5G system handles TSN service requirements via its own internal protocols and procedures.

Traffic shaping is a key flow control mechanism in TSN to achieve bounded latency, zero congestion loss and very small jitter while supporting co-existence of hard real-time, soft-real time and best-effort streams/applications. The existing TSN standard employs different traffic shaping mechanisms including credit-based shaper (802.1Qav), time-aware shaper (802.1Qbv), asynchronous traffic shaper (802.1Qcr), and peristaltic shaper (802.1Qch). The extension of TSN traffic shaping capabilities to a 5G system is particularly important for end-to-end performance guarantees in integrated 5G and TSN deployments; however, such extension is not trivial, as TSN-like traffic shaping capabilities must be realized through 5G internal protocols.

To this end, this application discloses novel techniques for extending TSN traffic shaping capabilities over 5G, in order to realize converged operation of the two systems. The disclosed traffic shaping framework, which is termed as X-Transit (Cross (X)-technology traffic shaping in integrated TSN and wireless systems), provides a pragmatic solution for manifestation of a 5G system as a virtual TSN bridge.

The arrangements described herein are specifically designed for joint operation of TSN and 5G systems. They enforce a time-synchronized cyclic forwarding strategy in a multi-hop integrated 5G/TSN system. They implement a novel technique for achieving time-aware traffic shaping in the radio access network (RAN). Moreover, they provide end-to-end optimization of a 5G system through TSN-centric Quality of Service (QoS) enhancements and de-jittering packet buffers. Overall, the arrangements described herein provide an end-to-end resource allocation framework for a 5G system in order to realize seamless integration with a TSN system while providing TSN-grade performance.

The arrangements described herein (termed "X-Transit") have been specifically designed for integrated operation of 5G and TSN systems. The design of X-Transit includes various novel features, which are described as follows.

Joint Operation of 5G and TSN Systems—the present arrangements consider time-synchronized operation of a 5G system in tandem with that of TSN bridges. This is unlike most existing resource allocation techniques that focus on independent/isolated operation of a 5G system. The present arrangements enforce a time-synchronized cyclic forwarding strategy in a multi-hop integrated 5G/TSN system such that fixed length and configurable time intervals are allocated for transmission at each hop. Such operation of TSN bridges and a 5G system (as a virtual TSN bridge) provides bounded and deterministic end-to-end latency with zero congestion loss in integrated 5G and TSN deployments.

5G-centric Traffic Shaping on the Air-Interface—the Time Aware Shaper (TAS) is an integral component of a TSN system. It provides fine-grained QoS for critical traffic streams requiring deterministic and bounded latency. The present arrangements implement a novel technique to realize time-aware traffic shaping on the air-interface while accounting for the dynamics of the 5G system. Existing radio resource allocation/slicing techniques do not offer such traffic shaping capabilities.

End-to-End 5G System Optimization—In order to meet the stringent requirements of TSN streams in integrated deployments, the present arrangements provide end-to-end optimization of a 5G system. This is achieved through TSN-centric enhancements to 5G QoS framework and a 2-level mapping algorithm for differentiated treatment of TSN traffic in the radio access network (RAN) and the core network of the 5G system. State-of-the-art resource allocation techniques are mostly focused on radio/wireless resources or the RAN. As part of end-to-end optimization, the present arrangements implement de-jittering packet buffers at the edges of the 5G network in order to achieve deterministic performance under the dynamics of wireless environments.

The arrangements described herein provide the following key advantages:
- End-to-end performance guarantees are provided irrespective of the topology of the multi-hop integrated 5G and TSN system. This is due to time-synchronized cyclic operation of the overall system. This is particularly important for ring topologies, which are typically deployed in industrial automation networks.
- The present arrangements do not restrict TSN ingress or egress ports for a 5G system. They support both user equipment (UE) side and data network (User Plane Function, UPF) side ingress. This is also facilitated by UE-side TSN grandmaster clock operation.
- The cyclic operation of the integrated 5G and TSN system provides a simplified cycle time calculation.
- The present arrangements provide time-aware shaping capability on the air-interface. Therefore, they provide native support for TSN as a backhaul between the RAN and the UPF.
- The present arrangements are directly compatible with network slicing techniques. The time-aware shaping capabilities provide slice customization functionality on the air-interface. From another perspective, time-aware shaping provides a RAN slicing technique. The TSN-centric QoS enhancements and end-to-end optimization framework provide differentiated treatment within a single (end-to-end) TSN slice for different types of TSN traffic.

The present arrangements are backward-compatible with a 4G-LTE system. Hence, they can be implemented in non-standalone 5G deployments leveraging a 4G core network (EPC).

Overview of 5G Protocol Stack and Air-Interface

FIG. 1 shows a network and protocol stack for use with the implementations described herein. Specifically, FIG. 1 illustrates the architecture and protocol stack (user-plane as well as control-plane) of a 5G New Radio (NR) network.

This illustrates the architecture for a 5G New Radio (NR) network. The network is divided into a core network and a radio access network (RAN). The core network comprises controllers 10 that are configured to manage the network. The radio access network comprises base stations 20 (otherwise known as gNodeB) for communicating wirelessly with end devices, otherwise known as User Equipment, UE (not shown).

Each controller 10 is configured to communicate with end devices via base stations 20. To this end, each controller 10 is connected to each base station 20 either wirelessly or via a direct (e.g. wired) connection.

Whilst three base stations 20 are shown in FIG. 1, it will be appreciated that any number of base stations may be utilized with the present methodology.

FIG. 1 also shows the protocol stack for a 5G New Radio network. This shows the user-plane as well as the control-plane.

The terminology for the protocol stack layers is given below. The 4G Long Term Evolution (LTE) network has a similar architecture with a slightly different terminology for entities and interfaces. The 4G-LTE network has a similar protocol stack with the exception of the AS layer. However, the actual protocol layer functionality could be different for the two networks.

PHY—Physical layer
MAC—Medium access control layer
RLC—Radio link control layer
PDCP—Packet data convergence protocol layer
RRC—Radio resource control layer
NAS—Non-access stratum layer
AS—Access stratum layer The new AS layer in 5G-NR is the service data adaptation protocol (SDAP) layer.

One of the main differences between 4G-LTE and 5G-NR is that the former uses a fixed numerology of 15 kHz orthogonal frequency division multiplexing (OFDM) sub-carrier spacing, whereas the latter supports a scalable numerology with sub-carrier spacing of 15 kHz, 30 kHz, and 60 kHz for below 6 GHz and 60 kHz and 120 kHz for above 6 GHz operation. A higher sub-carrier spacing leads to reduction in timeslot duration. In 4G-LTE, a slot comprises 14 OFDM symbols and corresponds to a transmission time interval (TTI). A reduction in TTI is possible through either scaling the sub-carrier spacing or fewer number of OFDM symbols.

The present application introduces the following two terminologies:

Short TTI—A short transmission time interval (TTI) that is shorter than the 4G-LTE TTI. This can either contain the same number of OFDM symbols as in 4G-LTE with a higher sub-carrier spacing (e.g., 30 kHz) or utilize a smaller number of OFDM symbols (e.g., 7, 3, or 2 symbols).

Mini-slot—A mini-slot can start at any OFDM symbol and it has variable length in terms of the number of OFDM symbols irrespective of the numerology.

Figure 2:
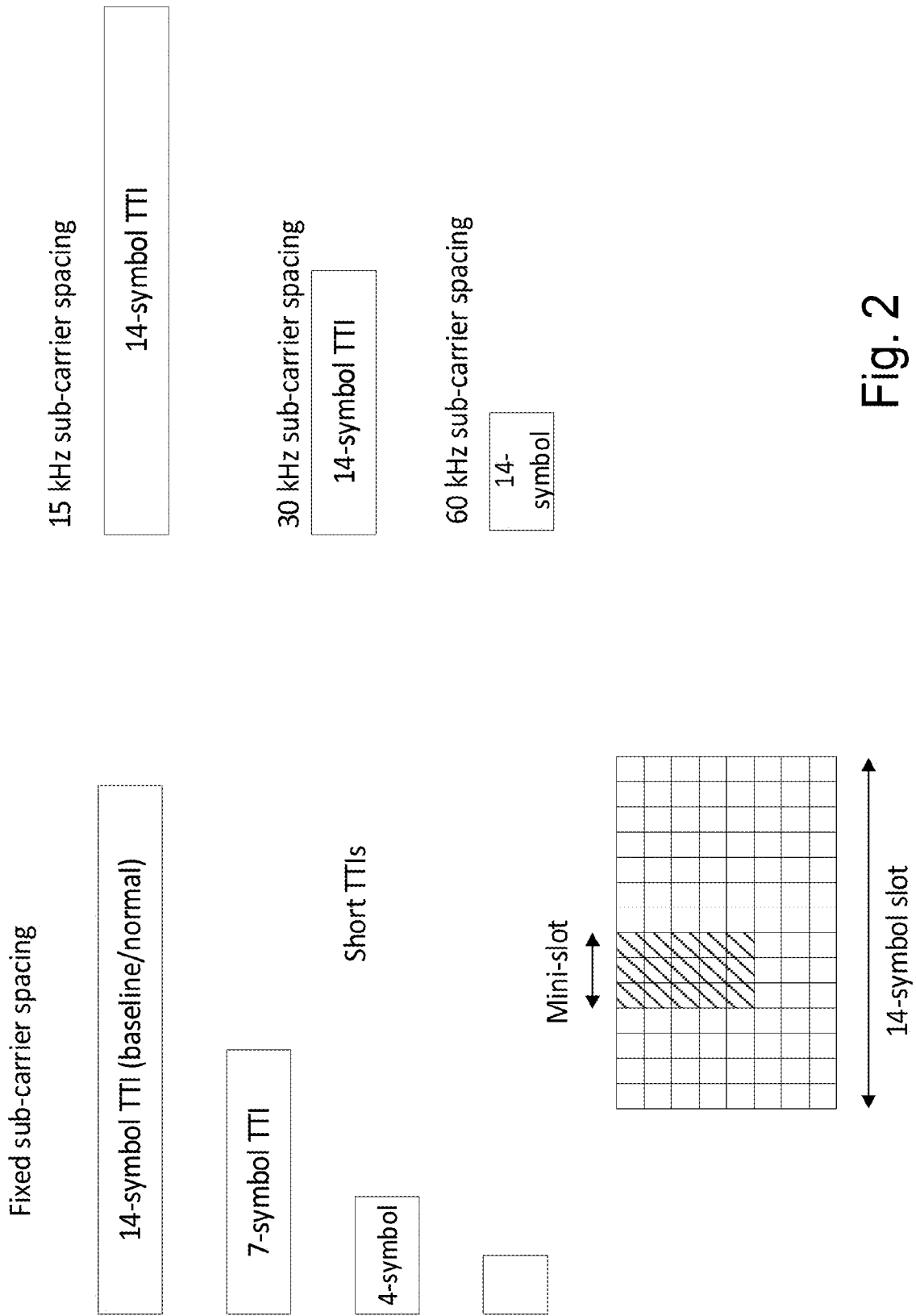
FIG. 2 shows potential transmission time intervals for fixed-carrier spacing and variable sub-carrier spacing as well as illustrating the comparative size of a mini-slot to a 14-symbol slot.

The concepts of scalable OFDM numerology, short TTI and mini-slot are illustrated in FIG. 2.

FIG. 2 shows potential TT's for fixed-carrier spacing and variable sub-carrier spacing as well as illustrating the comparative size of a mini-slot to a 14-symbol slot.

Short TT's can be achieved with fixed sub-carrier spacing by reducing the number of symbols. Equally, short TT's can be achieved by increasing the sub-carrier spacing (reducing the symbol time).

As shown on the left of the diagram, a baseline/normal TTI is illustrated as 14 symbols in length, with examples of short TT's at 7, 4 and 2 symbols length illustrated below. On the right hand side of FIG. 2, various different length short TT's are illustrated, effected by altering the sub-carrier spacing while retaining the number of symbols at 14.

On the bottom of the diagram, a mini-slot is shown, shaded in a 14 symbol slot, of across an arbitrary number of sub-carriers and across an arbitrary number of symbols.

The 14-symbol slot has 14 symbols distributed over time, and 8 sub-carriers distributed over frequency. The slot is divided into resource elements, each one being allocated a particular symbol (in the time axis) and subcarrier (in the frequency axis). Accordingly, the 14-symbol slot shown has 14×8=112 resource elements.

A slot is a predefined grouping of symbols. Each slot may be divided into a number of resource blocks, made up of the predefined grouping of symbols and a predefined range of sub-carriers. For instance, in 4G-LTE, a resource block is made up of 12 consecutive subcarriers and 7 OFDM symbols (84 resource elements).

The mini-slot is indicated through cross-hatching. The mini-slot can have any number of symbols. In the present case, three symbols are assigned to the mini-slot at the fifth symbol within the 14-symbol slot. The mini-slot is allocated five sub-carriers.

Whilst the above implementation relates to a specific implementation having specific numbers of symbols and subcarriers for the resource block and mini-slot, these can be varied between implementations.

The reader will note that the concept of short TT's is applicable to a 4G system as well; however, mini-slots are specific to a 5G system only.

X-Transit—System Model and Key Assumptions

Figure 3:
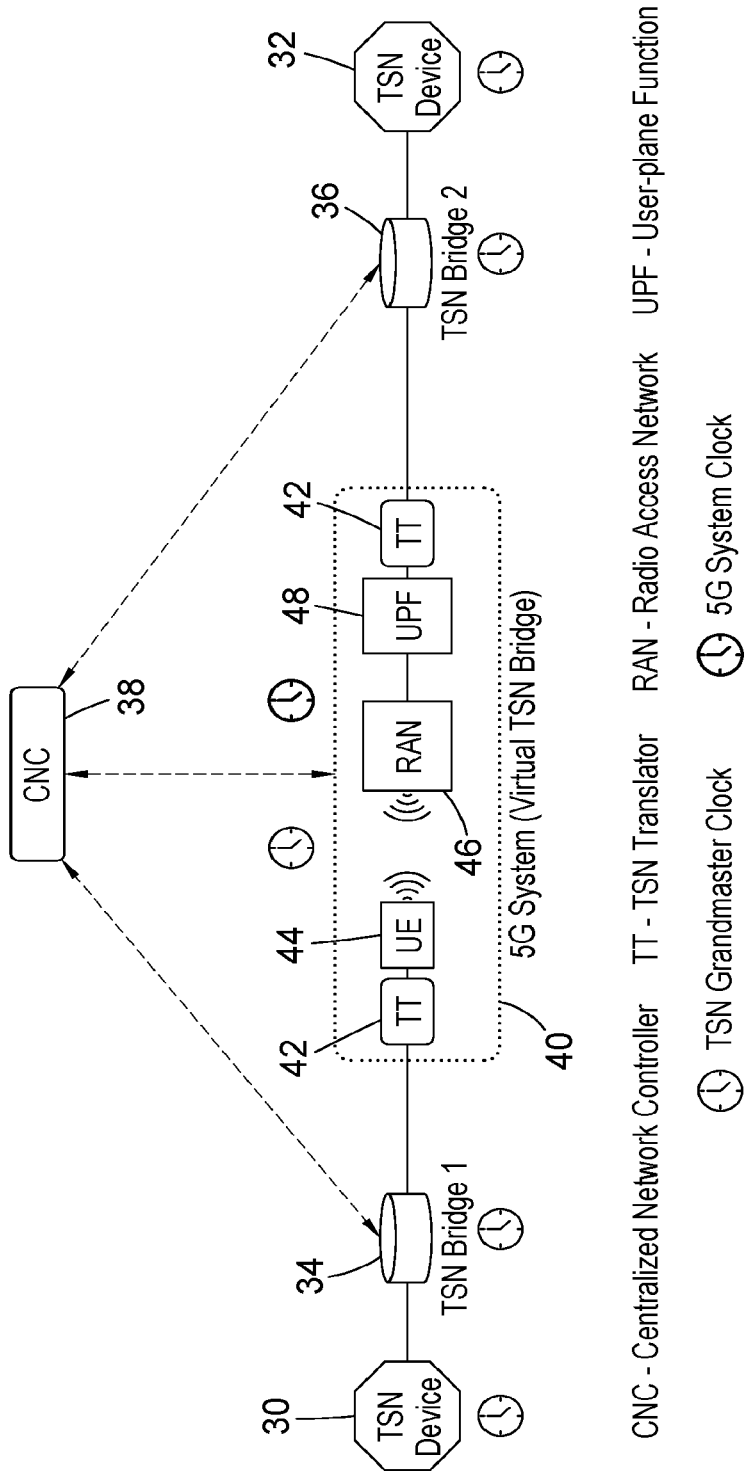
FIG. 3 shows an overall system model of a 5G virtual TSN bridge according to an arrangement.

FIG. 3 shows an overall system model of a 5G virtual TSN bridge according to an arrangement.

Two TSN devices 30, 32 (e.g. a controller and an actuator or robot) are configured to communicate with each other via a 5G system 40 that forms a virtual TSN bridge. One TSN device 30 is located on a network side of the 5G system 40, which the other 32 is located on the user-equipment side.

Each TSN device 30, 32 is connected to a TSN bridge (TSN Bridge 1 and TSN Bridge 2, 34 and 36 respectively). These bridges, in turn, are connected to TSN Translators (TTs) 42.

The TSN Translators (TTs) provide ingress and egress ports for the 5G system 40. On the user equipment (UE) side of the network, the respective TT 42 is connected to a UE transceiver 44. On the network side, the respective TT is connected to a radio access network (RAN) 46 via user plane function UPF 48. The UE transceiver 44 and the RAN 46 (e.g. a gNodeB within the RAN 46) communicate with each other wirelessly over radio frequency channels. The UPF 48 within the 5G system provides the interface between the mobile infrastructure and the data network.

Without any loss of generality for application of the present arrangements, a centralized configuration model is considered for TSN and 5G integration where the centralized network controller (CNC) 38 is responsible for configuration and management of the integrated system. The CNC 38 communicates with the TSN bridges 34, 36 and the 5G system 40 to manage the virtual TSN bridge. The interaction between the CNC and the 5G system is beyond the scope of this application.

Figure 4:
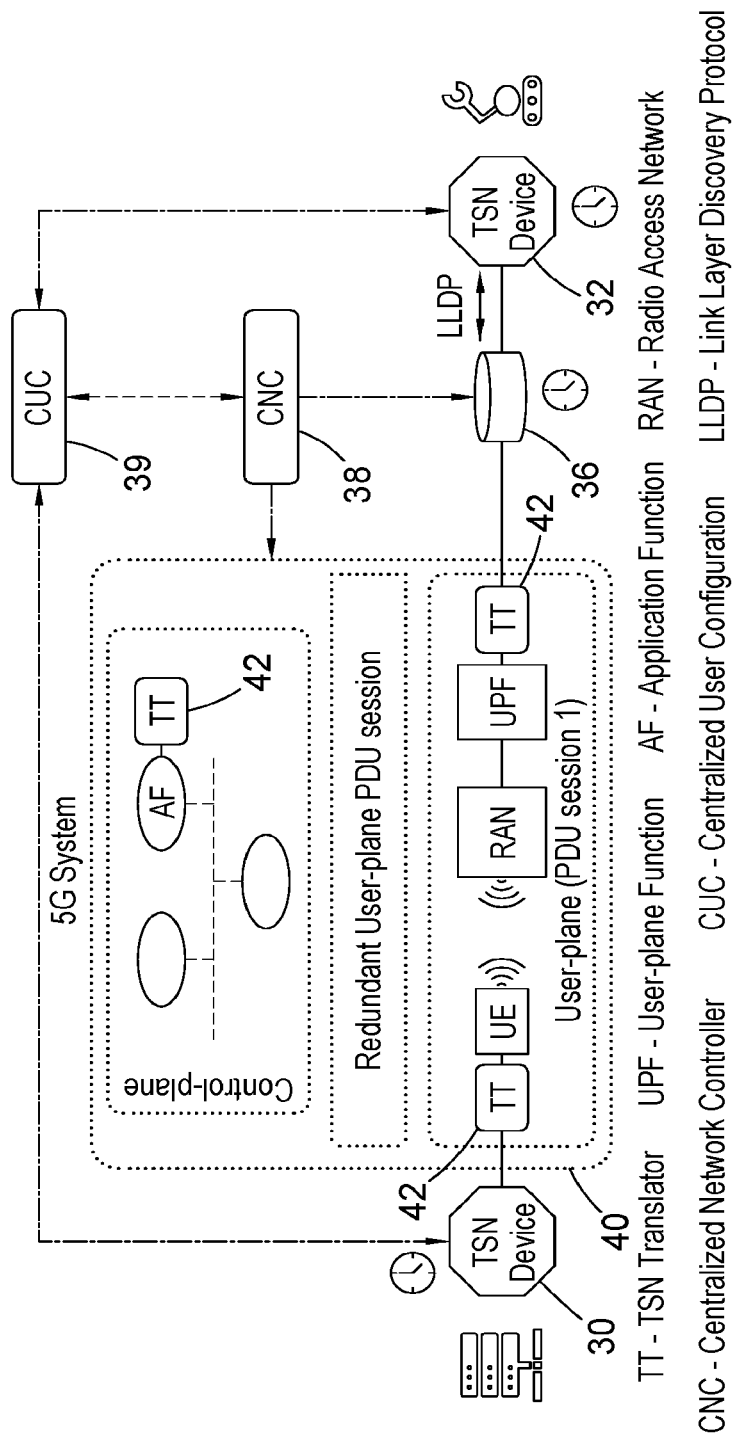
FIG. 4 shows a bridge model for 5G and TSN integration according to an arrangement.

FIG. 4 shows a bridge model for 5G and TSN integration according to an arrangement.

Building on the structure shown in FIG. 3, the 5G system is divided into various planes, including the control plane and the user plane. The user plane is divided into a variety of packet data unit (PDU) sessions. The communication between the two TSN devices shown herein is through a first PDU session (PDU session 1).

The 5G system 40 provides ingress and egress ports via the TSN Translators (TTs) 42. These TTs 42 are used for both the control-plane and the user-plane and are located on the user-equipment (UE) side as well as the network side.

As discussed above, the CNC 38 manages the virtual TSN bridge. This makes use of a centralized user configuration (CUC) 39.

Arrangements described herein can be applied to fully distributed or partially centralized TSN configuration models as well. The overall system model (illustrated in FIG. 3), assumes TSN devices like talkers (controllers, sensors, etc.) and listeners (actuators, robots, etc.) sharing information over a multi-hop system comprising one or more TSN bridges. Moreover, the multi-hop system includes the 5G system as a virtual TSN bridge.

In the present arrangement, the integrated 5G and TSN system is time synchronized to the TSN grandmaster clock based on IEEE 802.1AS. However, other clock models (e.g., synchronization to the 5G system clock) are also possible. The 5G system has access to TSN grandmaster time.

X-Transit—Joint Operation of 5G and TSN Systems

Figure 5:
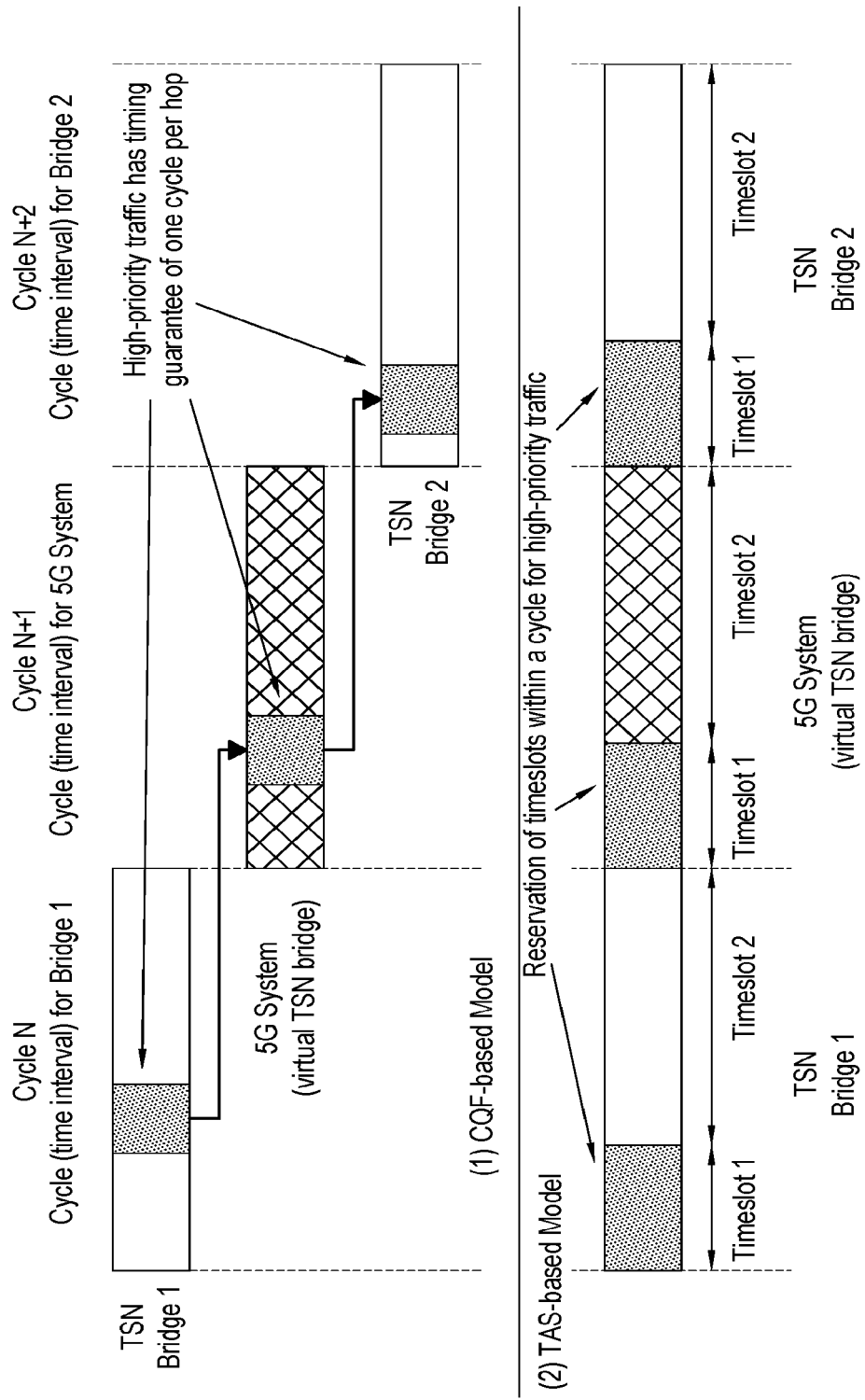
FIG. 5 shows a time-synchronized cyclic forwarding strategy for converged operation of 5G and TSN systems according to an arrangement.

FIG. 5 shows a time-synchronized cyclic forwarding strategy for converged operation of 5G and TSN systems according to an arrangement. Fixed length cycles are allocated (by the CNC) for transmissions at each hop of the integrated 5G and TSN system. The fundamental concept is that frames arriving in cycle N will be transmitted in cycle N+1 at the next hop. Such time-synchronized cyclic operation provides bounded and deterministic end-to-end latency with zero congestion loss.

Each "hop" within the network is a transmission within the wireless system between two nodes. In a multi-hop system, messages may be passed between multiple nodes before they reach their intended destination, or reach a central node that forwards the message on to the central network.

The arrangements described herein can be extended to two different models for cyclic operation.

The first model is based on IEEE 802.1Qch Cyclic Queuing and Forwarding (CQF), wherein frames received within a cycle are transmitted in a prioritized fashion at the beginning of the next cycle. High-priority traffic has a timing guarantee of one cycle per hop and it is transmitted along with low-priority traffic. Low priority traffic does not have a timing guarantee, so may be delayed and transmitted over multiple cycles. No specific timeslots are reserved for high priority traffic, but transmission in each cycle prioritizes high priority traffic. Low priority traffic is then transmitted in using any remaining resources after the high priority traffic has been scheduled.

The second model is based on IEEE 802.1Qbv Time-aware Shaper (TAS) wherein the cycle is further split into dedicated timeslots (traffic windows) for critical and best-effort traffic. In this arrangement, one or more specific timeslots within each cycle are set aside (reserved) for high priority traffic. Any remaining timeslots within each cycle are set aside for low priority traffic.

Note that both models for cyclic operation enforce a fixed time window on the 5G system (virtual TSN bridge) to forward the TSN traffic with performance guarantees. However, the CQF-based model is more appropriate for integrated deployments due to the dynamic nature of the 5G system. It is emphasized that the present arrangements can operate under both models.

The present embodiments employ a TAS mechanism on the 5G air-interface (radio interface). Therefore, some preliminaries on TAS are covered as follows.

Time-Aware Shaper (TAS) in TSN

The Time-aware Shaper (TAS) is a scheduler within TSN that schedules critical traffic streams in time-triggered windows, which are also referred to as protected traffic windows.

Figure 6:
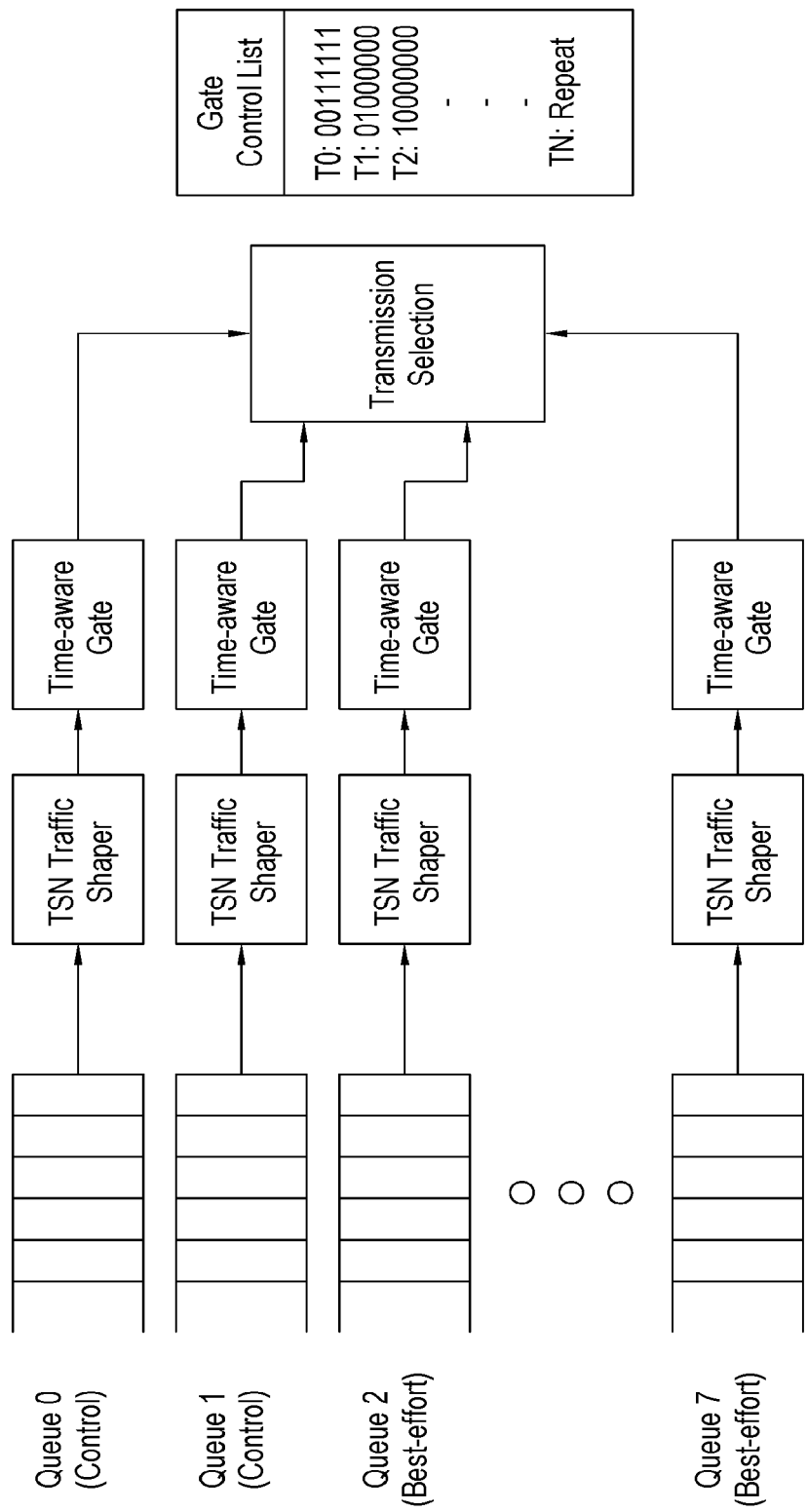
FIG. 6 illustrates time aware traffic shaping (TAS) in a TSN system.

FIG. 6 illustrates time aware traffic shaping (TAS) in a TSN system. Traffic is separated into different queues based on the type of traffic and its relative priority. In the present example, Queue 0 and Queue 1 are reserved for control data, whilst Queue 2 to Queue 7 are reserved for non-control (best-effort) data.

The core concept of TAS is to emulate the time-division multiplexing operation for all the queues (belonging to different traffic classes) at the egress port of a TSN switch using timed gates that open/close according to a pre-defined schedule.

Each queue is provided its own time-aware gate that opens and closes according to the predefined schedule. An open/close instruction is called a gate control entity (GCE), which dictates which queues have access to the transmission medium. The entire sequence of GCEs is referred to as the gate control list (GCL), which is configured by the CNC. In order to prevent lower priority traffic interfering with the higher priority traffic, the windows for critical traffic (scheduled traffic) are preceded by guard intervals.

A frame from a given queue with an open gate is transmitted if: (a) the queue contains a frame ready for transmission, (b) higher priority traffic class queues with an open gate do not have a frame to transmit and (c) the frame transmission can be completed before the gate closes for the given queue.

X-Transit—Dynamic TAS Over the 5G Air-Interface

The arrangements described herein implement a novel Time-aware Shaper (TAS) over the air-interface (between the UE and the RAN) that provides timely delivery of TSN traffic under strict latency constraints imposed by the cyclic operation. The proposed air-interface traffic shaping technique specifically accounts for the dynamics of the 5G RAN while meeting the requirements of different types of TSN traffic and optimizing utilization of air-interface resources.

Figure 7:
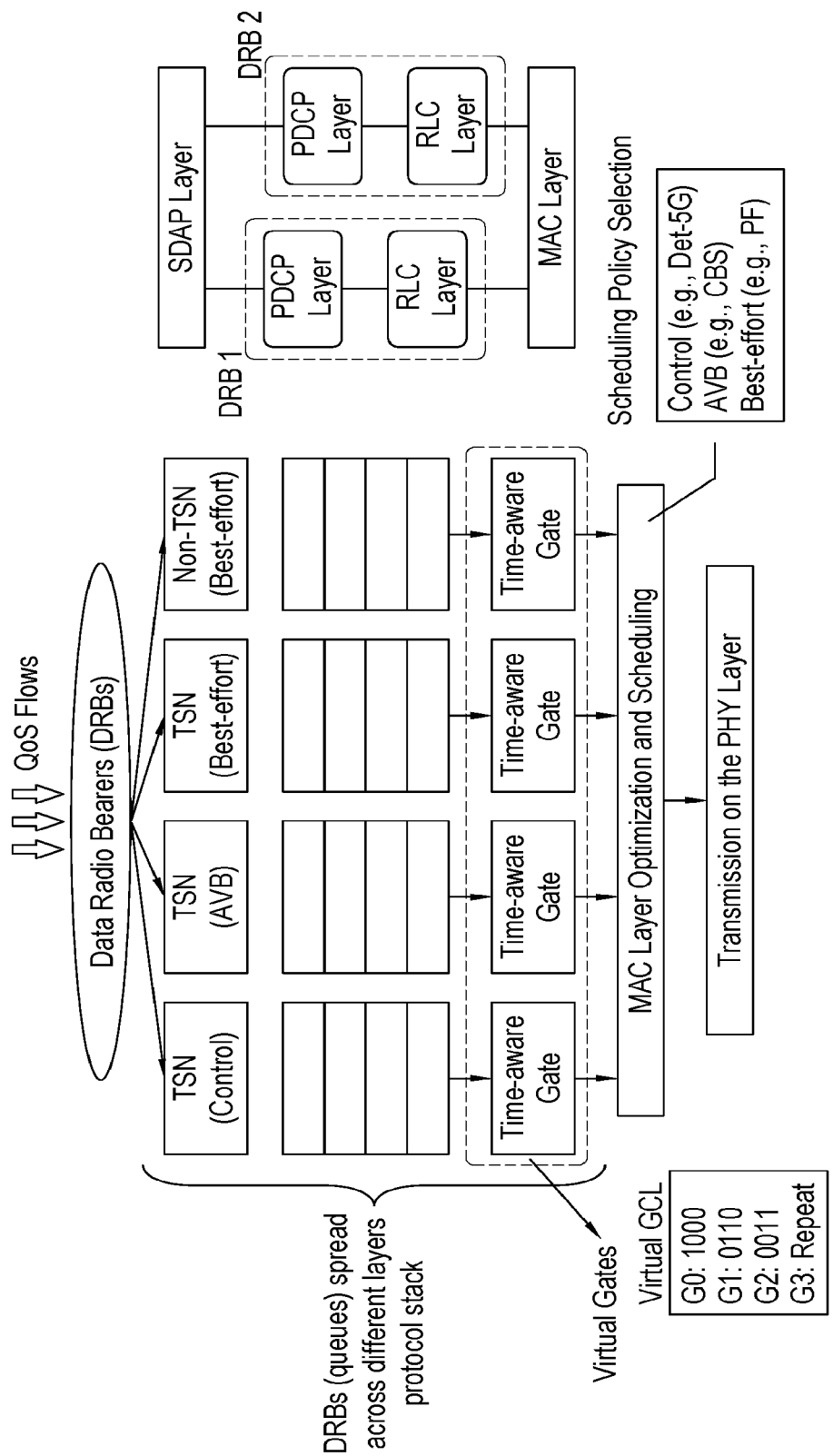
FIG. 7 shows the functional architecture and protocol operation of TAS over 5G air-interface according to an arrangement.

Functional Aspects—The overall concept of traffic shaping in the present arrangements is illustrated in FIG. 7.

FIG. 7 shows the functional architecture and protocol operation of TAS over 5G air-interface according to an arrangement. The user-plane data traffic is carried in data radio bearers (DRBs) over the air-interface. A DRB is a packet transport service offered by Layer 2 in cellular stack (MAC, RLC and PDCP layers) to the upper layers. A single UE can have multiple DRBs. Moreover, a DRB may transport one or more Quality of Service (QoS) flows as discussed later.

The present arrangements consider DRBs in the 5G system as virtual queues similar to the queues used in conventional TSN systems. However, these queues are spread across different layers of the air-interface protocol stack. The present arrangement (X-Transit) considers a separate DRB for different types of TSN traffic. Typically, TSN systems across various industrial domains contain a mix of control (e.g., closed-loop) traffic, audio video bridging (AVB) traffic (also control-centric in nature) and best-effort traffic. Therefore, we assume three distinct DRBs for TSN traffic. Note that this is just an example, and there could be one or more DRBs for each class of traffic (e.g. one or more DRBs for non-TSN traffic).

The ingress point of the queue for TAS is the SDAP layer whereas the egress point is the physical downlink/uplink shared channel at the PHY layer. As with the TSN method shown in FIG. 6, the adapted TSN method makes use of a predefined schedule for opening each (virtual) gate in the form of a virtual GCL. The virtual GCL does not provide a schedule for transmissions, but instead is a schedule dictating when various DRBs gain access to the radio resources for the purposes of scheduling transmissions. Once a DRB gains access to the radio resources, it is able to schedule transmissions in accordance with rules that shall be discussed later (based on relative priority, the multiplexing scheme being used, remaining data budget, etc.). The transmissions need not be scheduled in timeslots that correspond to the windows of the GCL. Instead, the GCL simply specifies the order by which scheduling is performed.

Extending TAS over the air-interface also provides the capability of customizing DRBs to fulfil the requirements of different types of TSN traffic. One example is PDCP layer packet duplication for control traffic. Similarly, it provides the capability of appropriate scheduling techniques at the MAC layer. For example, if one DRB carries closed-loop control traffic then the MAC layer can allocate resources in a deterministic manner with improved reliability but increased overhead to ensure successful transmission. Similarly, proportional fairness (PF) scheduling techniques can be used for best-effort traffic.

Figure 8:
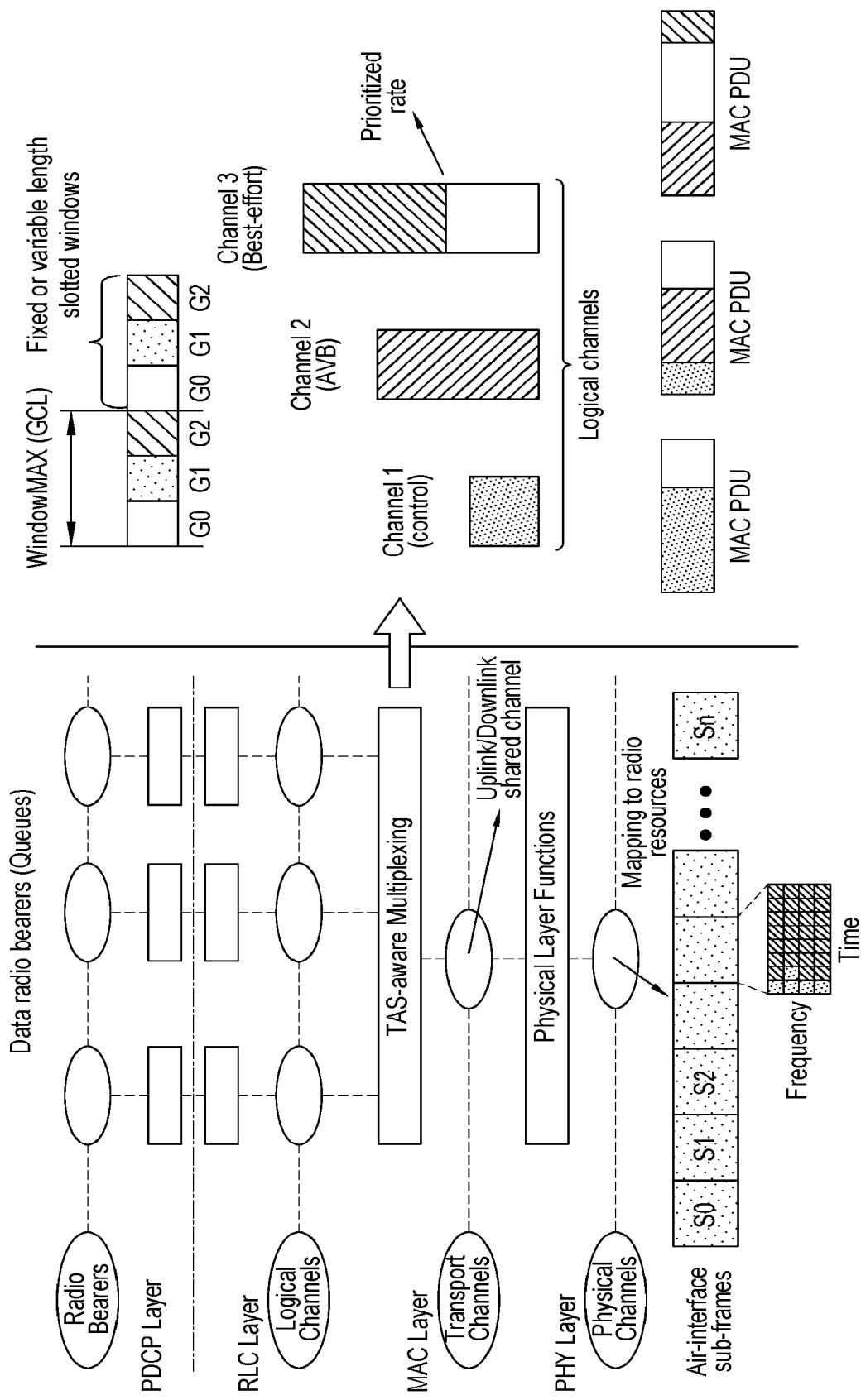
FIG. 8 illustrates protocol operation of different layers of the protocol stack according to an arrangement.

GCL Derivation and Protocol Operation—FIG. 8 illustrates protocol operation of different layers of the protocol stack according to an arrangement. This shows the key aspects of TAS for the air-interface. The base station derives a Gate Control List (GCL) after sorting DRBs into TAS queues. Each Gate Control Entity (GCE) of the GCL provides access to the transmission medium for the purposes of scheduling transmissions.

As discussed later with regard to FIG. 12, the GCE windows do not necessarily directly relate to transmission windows, as the actual allocation of transmission resources can vary relative to the GCE schedule, which defines the order in which scheduling is performed for the DRBs. For adaptive TAS and periodicity-centric allocations, the GCEs map to appropriate s-TTIs on the air-interface, for example, the next available s-TTI if the MAC PDU contains data from a DRB containing control traffic.

Nevertheless, in some embodiments, there is a direct relation between the GCE windows and the time windows for transmission. For instance, in a TAS centric allocation procedure each GCE provides a slotted window for transmission from each DRB. For instance, in the present case G0 is allocated to control, G1 is allocated to AVB and G2 is allocated to best-effort DBRs. The slotted windows could be of fixed or variable duration. The GCL defines the maximum window size (WindowMAX) which is repeated periodically.

Data from different DRBs is handled by the PDCP and RLC layers before it is mapped to logical channels. At the MAC layer, a TAS-aware multiplexing operation takes place before data is carried in the transport channels. The transport channels are then mapped to physical layer channels before the air interface sub-frames are transmitted.

The present arrangement implements a MAC layer optimization technique to ensure timely delivery of control information and high resource utilization. Therefore, the GCL in this arrangement is virtual in nature as it is mapped onto air-interface resources. Moreover, the GCL can be dynamically reconfigured as the size of different slotted windows for transmission is dynamically adjusted based on MAC layer operation.

Figure 9:
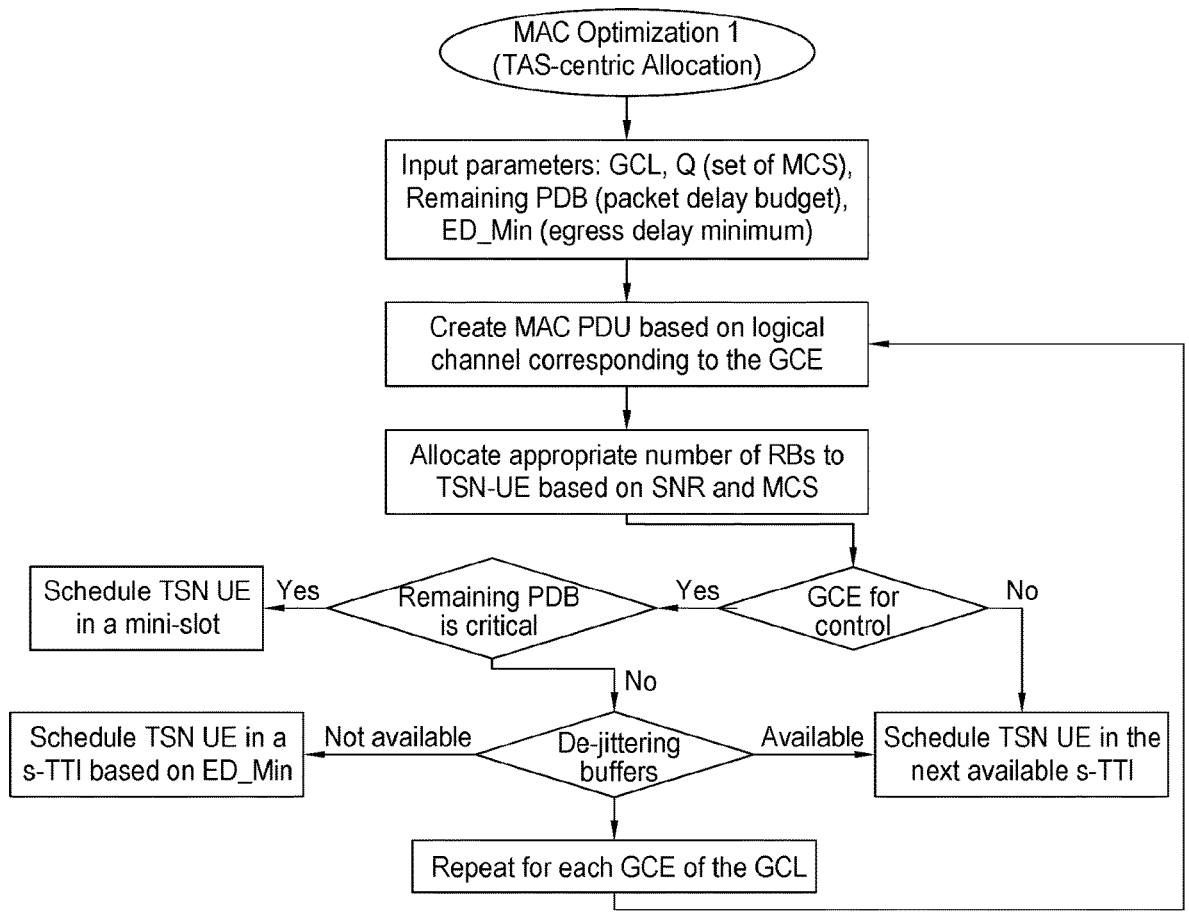
FIG. 9 shows a flow chart of a first optimization method providing a TAS-centric resource allocation strategy according to an arrangement.

MAC Layer Optimization (Algorithm 1)—FIG. 9 shows a flow chart of a first optimization method providing a TAS-centric resource allocation strategy according to an arrangement. It enforces a GCL on the air-interface by directly mapping the slotted windows on air-interface sub-frames (containing slots, mini-slots, symbols, etc.).

For each GCE of the GCL, the MAC layer creates a MAC Protocol Data Unit (PDU) without logical channel multiplexing. Based on the channel conditions, in terms of signal-to-noise ratio (SNR), and the available modulation and coding schemes (MCS), the TSN UE is allocated an appropriate number of resource blocks (RBs).

The method treats control data different to non-control data. If the MAC PDU is for a slotted window that does not contain critical information such as control or AVB data, then the transmission (e.g. either to or from the TSN UE connected to the TSN translator) is scheduled in the next available short TTI (s-TTI), which is also referred to as a slot. If the MAC PDU does contain critical information (e.g. control information), then remaining packet delay budget (PDB) becomes an important factor for scheduling. If the remaining PDB is critical, i.e., within a certain level of end-to-end PDB, the transmission is scheduled in a mini-slot. This is because a mini-slot can pre-empt any ongoing transmission. However, if the remaining PDB is not critical, the transmission is scheduled in any short TTI depending on the availability of de-jittering packet buffers at the edges of the 5G network. If de-jittering is available, the transmission is scheduled in the next available slot. If de-jittering is not available, then the transmission is scheduled in a slot based on the egress delay minimum (ED_Min), which is the earliest possible time instant at which a packet can arrive at the egress port relative to its arrival at the ingress port of the 5G system. The de-jittering packet buffers are discussed in more detail later. The algorithm continues for each GCE of the GCL.

Figure 10:
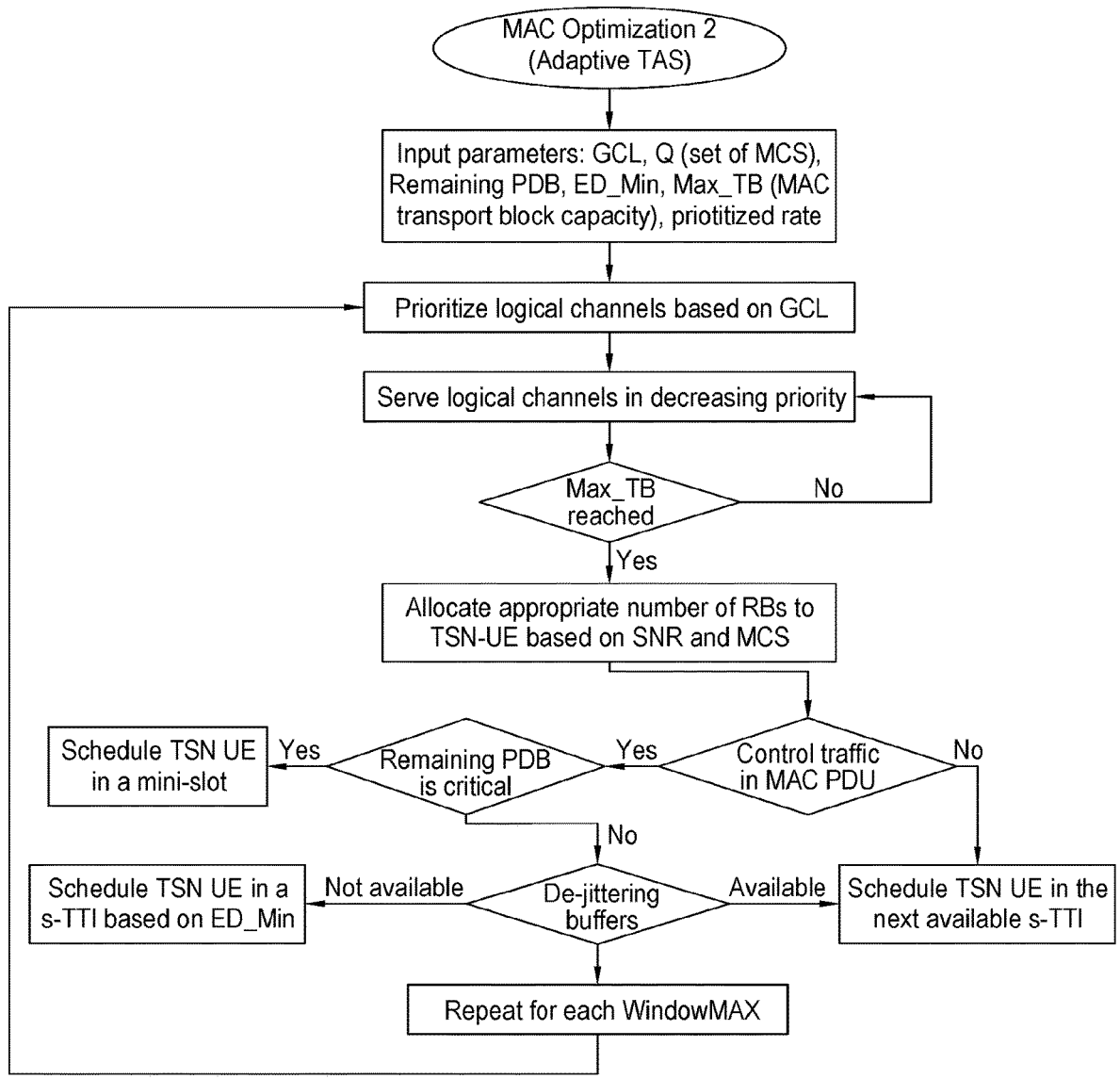
FIG. 10 shows a flow chart of a second optimization method providing an adaptive TAS strategy in accordance with an arrangement.

MAC Layer Optimization (Algorithm 2)—FIG. 10 shows a flow chart of a second optimization method providing an adaptive TAS strategy in accordance with an arrangement. This provides efficient resource utilization of wireless/radio resources.

During each cycle (each WindowMAX), the method prioritizes logical channels corresponding to different DRBs based on the GCL. The logical channel for control has higher priority than that for AVB traffic. Similarly, the logical channel for AVB has higher priority than that of the best-effort traffic. To avoid starvation, a prioritized rate is defined for the best-effort traffic. It dictates the minimum volume of traffic that is multiplexed from the logical channel. The prioritized rate for the logical channels for both control and AVB traffic is set to infinity (i.e. there is no minimum volume of traffic for these channels).

The MAC layer performs a logical channel multiplexing procedure to create a MAC PDU. For best-effort traffic, data beyond the prioritized rate is incorporated depending on available capacity. Such logical channel multiplexing ensures that full capacity of the MAC PDU is utilized irrespective of whether there is traffic in a reserved slotted window or not. Once a MAC PDU is created, the transmitting device (e.g. the TSN UE or RAN) is allocated an appropriate number of RBs based on its channel conditions and the available MCS. If the MAC PDU contains critical information like control or AVB, the remaining PDB becomes an important factor in scheduling. Similar steps are followed as in Algorithm 1 above for scheduling the transmission. Note that a packet is dropped if the delay budget requirement is not fulfilled.

MAC Layer Optimization (Algorithm 3)—The third optimization algorithm has been specifically designed for the scenario of periodic traffic in the RAN coming from one or more TSN streams. This is possible if the latency between the RAN and the core network is fixed. One way to achieve this is to use TSN as the backhaul between the RAN and the core network.

Figure 11:
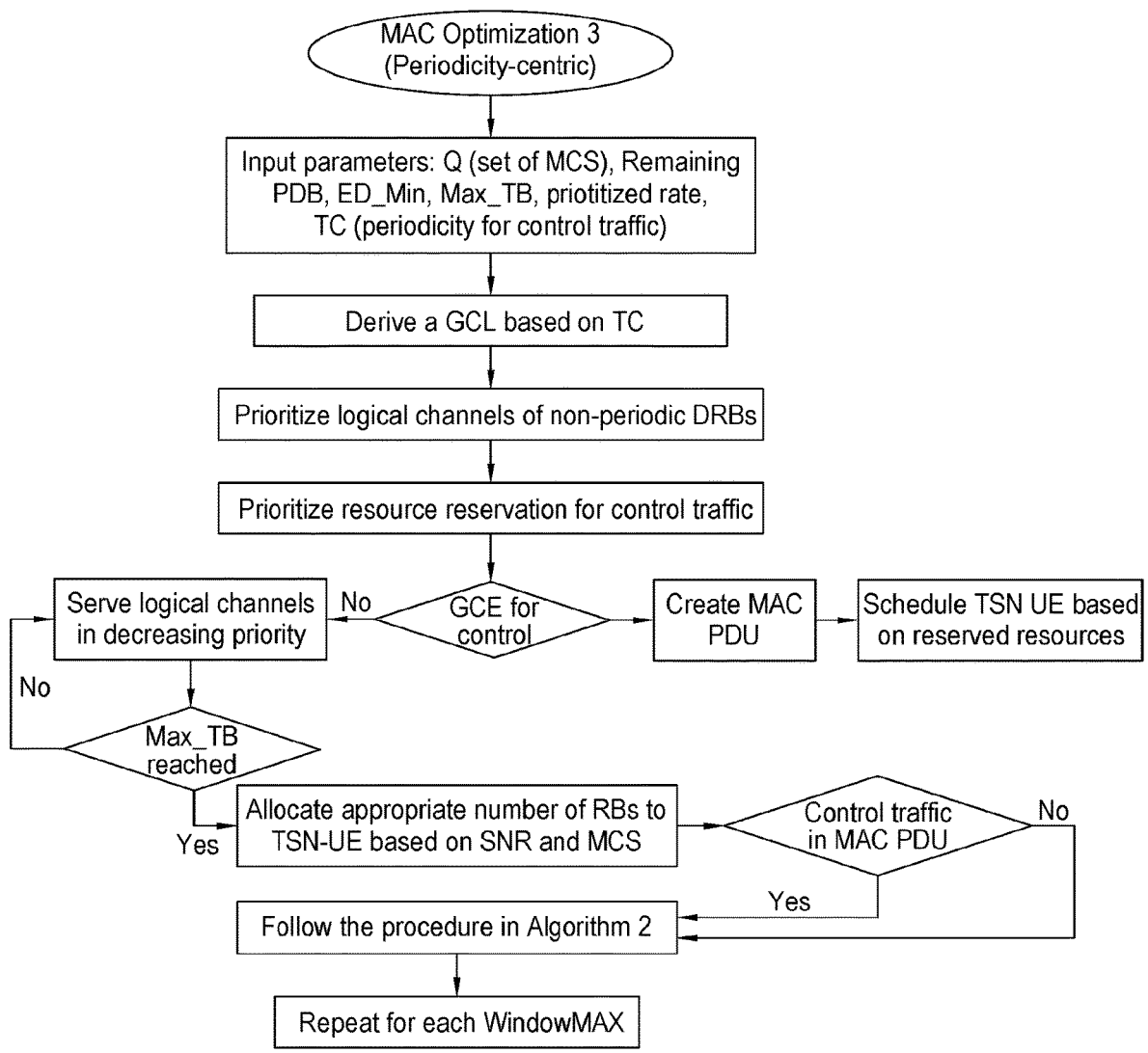
FIG. 11 shows a flow chart of a third optimization method providing a periodicity-centric allocation strategy according to an arrangement.

FIG. 11 shows a flow chart of a third optimization method providing a periodicity-centric allocation strategy according to an arrangement. A GCL is derived based on the periodicity factor (TC) of control traffic. Based on the periodicity factor, the MAC layer provides periodic resource reservation (e.g., through semi-persistent scheduling techniques in case of uni-directional control or through other deterministic methods in the case of bi-directional control).

If the GCE is for periodic control traffic, the MAC layer creates MAC PDU based on the logical channel for the corresponding DRB, and the TSN UE is scheduled based on reserved resources. Otherwise, the MAC layer performs a logical channel multiplexing procedure. In this case (i.e. for non-control GCEs), the logical channels are served in decreasing order of priority. Accordingly, the logical channels of non-periodic DRBs are prioritized and then allocated resources in decreasing order of priority until the transmission budget (Max_TB) has been reached (i.e. all resources within the budget have been allocated). This is achieved by selecting the highest priority channel yet to be scheduled and allocating available resources for this channel. If more channels are available for scheduling, the method checks whether the maximum budget has been reached. If not, the next highest priority channel is scheduled.

As with the second method, a prioritized rate may be defined for each non-control logical channel to ensure that at least a minimum amount of data is transmitted for each channel.

Once all channels have been scheduled, or the maximum transmission budget has been reached, the method continues to allocate resource blocks as per the method of Algorithm 2. The remaining steps follow the same procedure as Algorithm 2 (from "allocate appropriate number of RBs . . . " onwards).

The remaining steps follow Algorithm 2 (shown in FIG. 10).

Figure 12:
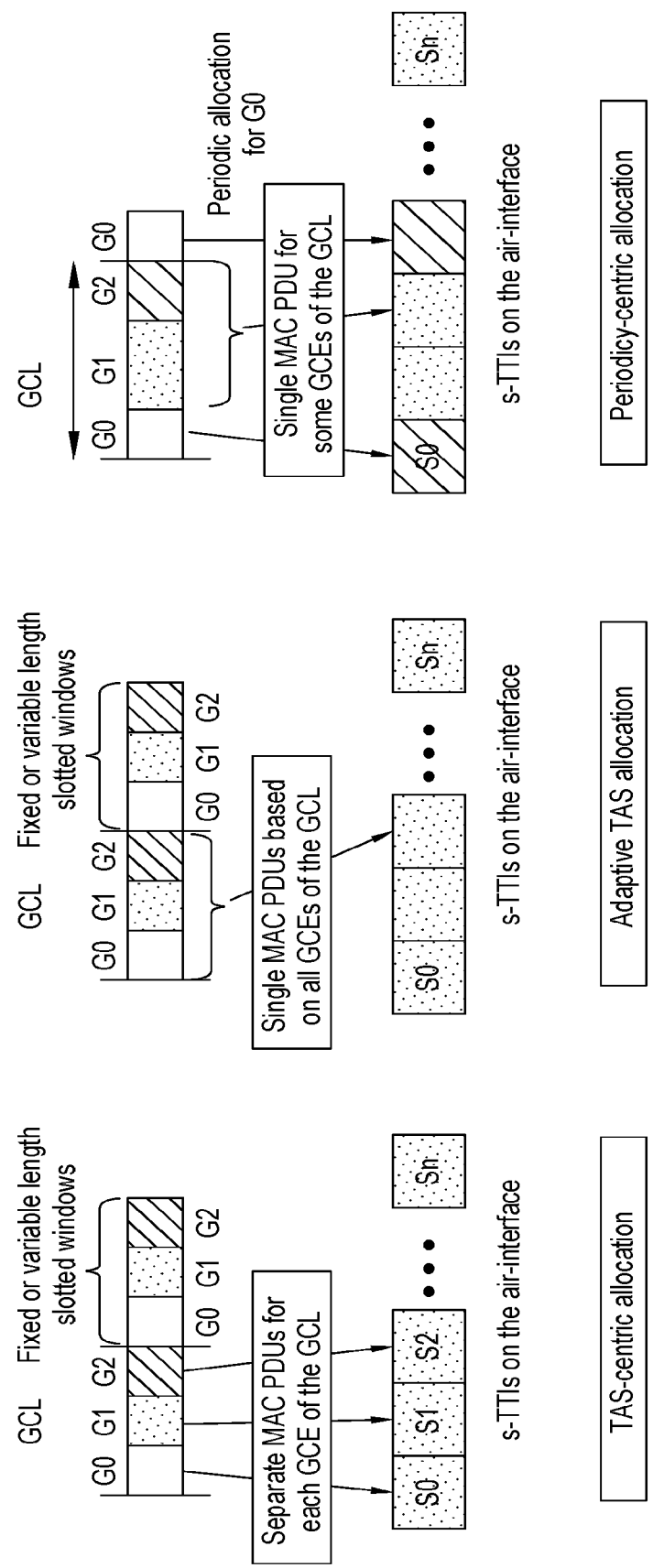
FIG. 12 shows a summary of the mapping from GCE to air-interface resources for the first, second and third optimization methods (TAS-centric, adaptive TAS and periodicity-centric allocations)

FIG. 12 shows a summary of the mapping from GCE to air-interface resources for the first, second and third optimization methods (TAS-centric, adaptive TAS and periodicity-centric allocations).

In the first optimization method (TAS-centric allocation), each GCE (each logical channel) within the GCL is allocated to a separate protocol data unit (PDU), or slot. The exception is where a control GCE is being allocated but there is less than a predefined amount of the transmission budget left to be allocated. In this case, the control GCE is allocated to a mini-slot, as it is able to pre-empt other scheduled slots to ensure that it is sent within the time window, thereby ensuring the control information is sent in each cycle.

In the second optimization method (adaptive TAS allocation), data from each of the GCEs (each of the logical channels) within the GCL is allocated to each PDU (each slot) in order of priority. Control data has higher priority than non-control data, but a minimum amount of non-control data is included in each slot to avoid starvation (to ensure that non-control data is transmitted eventually). This method ensures that the maximum available resources are allocated (i.e. that full capacity of the MAC PDU is utilized) irrespective of whether or not there is traffic in specific reserved slotted windows (specific GCEs).

The third optimization method (periodicity-centric allocation) is a mixture of the first two methods. Control GCEs (logical channels containing control data) are allocated to one or more specific PDUS (slots), whereas the remaining non-control data is scheduled in order of priority.

X-Transit—End-to-End Optimization of 5G System

The present arrangements provide end-to-end optimization of the 5G system to meet the requirements of TSN streams in integrated 5G and TSN deployments. The end-to-end optimization is crucial for performance guarantees under the constraints of time-synchronized cyclic operation. End-to-end optimization in the present arrangements is based on an end-to-end window for the 5G system.

Figure 13:
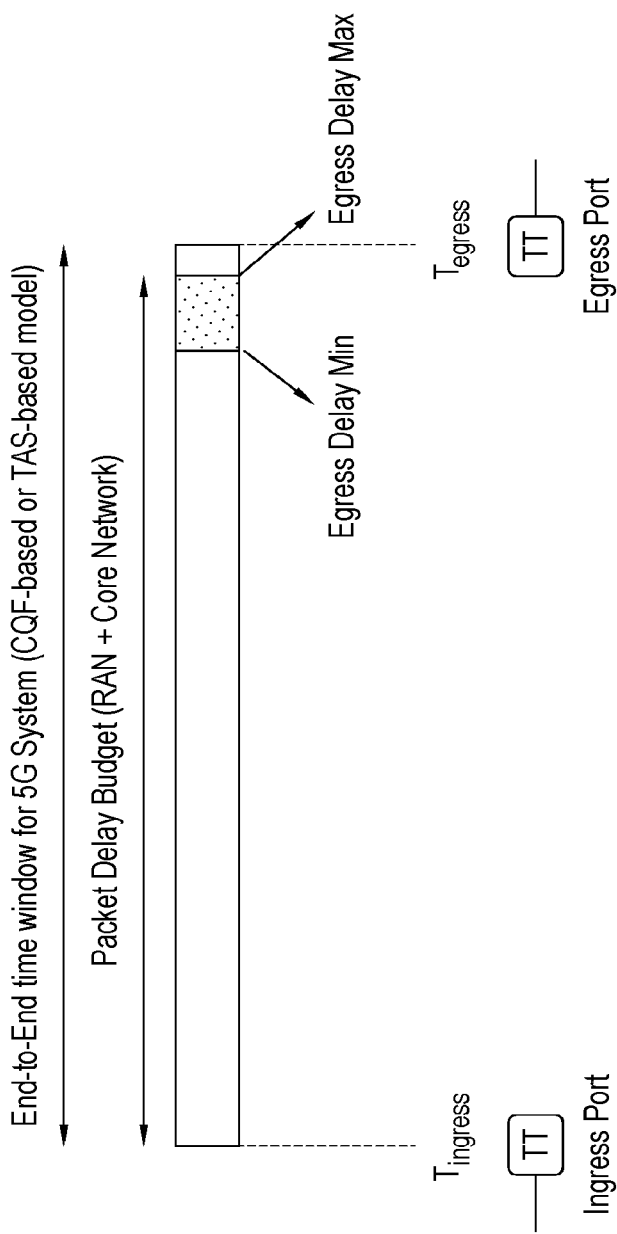
FIG. 13 shows an end-to-end window for the 5G system in accordance with an arrangement.

FIG. 13 shows an end-to-end window for the 5G system in accordance with an arrangement. The end-to-end window is the budgeted time window for transmission between the ingress port of the 5G system to the egress port of the 5G system. This window is made up of a packet delay budget and any delays associated with outputting the data through the egress port. The packet delay budget includes time budgeted for transmission across the radio access network (RAN) and transmission across the core network.

Within the packet delay budget, two new latency-centric parameters have been defined in order to provide deterministic performance. The egress delay minimum parameter defines the earliest possible time instant at which a packet can arrive at the egress port relative to its arrival at the ingress port of the 5G system. The egress delay maximum parameter defines the latest possible time instant at which a packet can arrive at the egress port relative to its arrival at the ingress port of the TSN system. The time between the egress delay minimum and the egress delay maximum is the time period over which packets are expected to be received at the egress port.

The overall end-to-end optimization framework consists of TSN-centric enhancements to 5G Quality of Service (QoS) framework and a 2-level mapping algorithm for end-to-end differentiated treatment of TSN traffic in a 5G system.

TSN-centric 5G QoS Enhancements—The 5G QoS model is based on QoS flows aggregated in protocol data unit (PDU) sessions.

In this context, Quality of Service (QoS) refers to traffic prioritization and resource allocation control based on the type of data being transferred. QoS policies allow for the provision of different queues for different types of data, as discussed earlier. This in contrast to quality of service in the context of transmissions, that refers to the quality of network service, as represented by signal quality, noise, data loss, etc. Flow control relates to controlling the rate of transmission of data through the system. Accordingly, QoS flow control relates to controlling the rate of transmission of different types of data (controlling data flow for different types of data).

Figure 14:
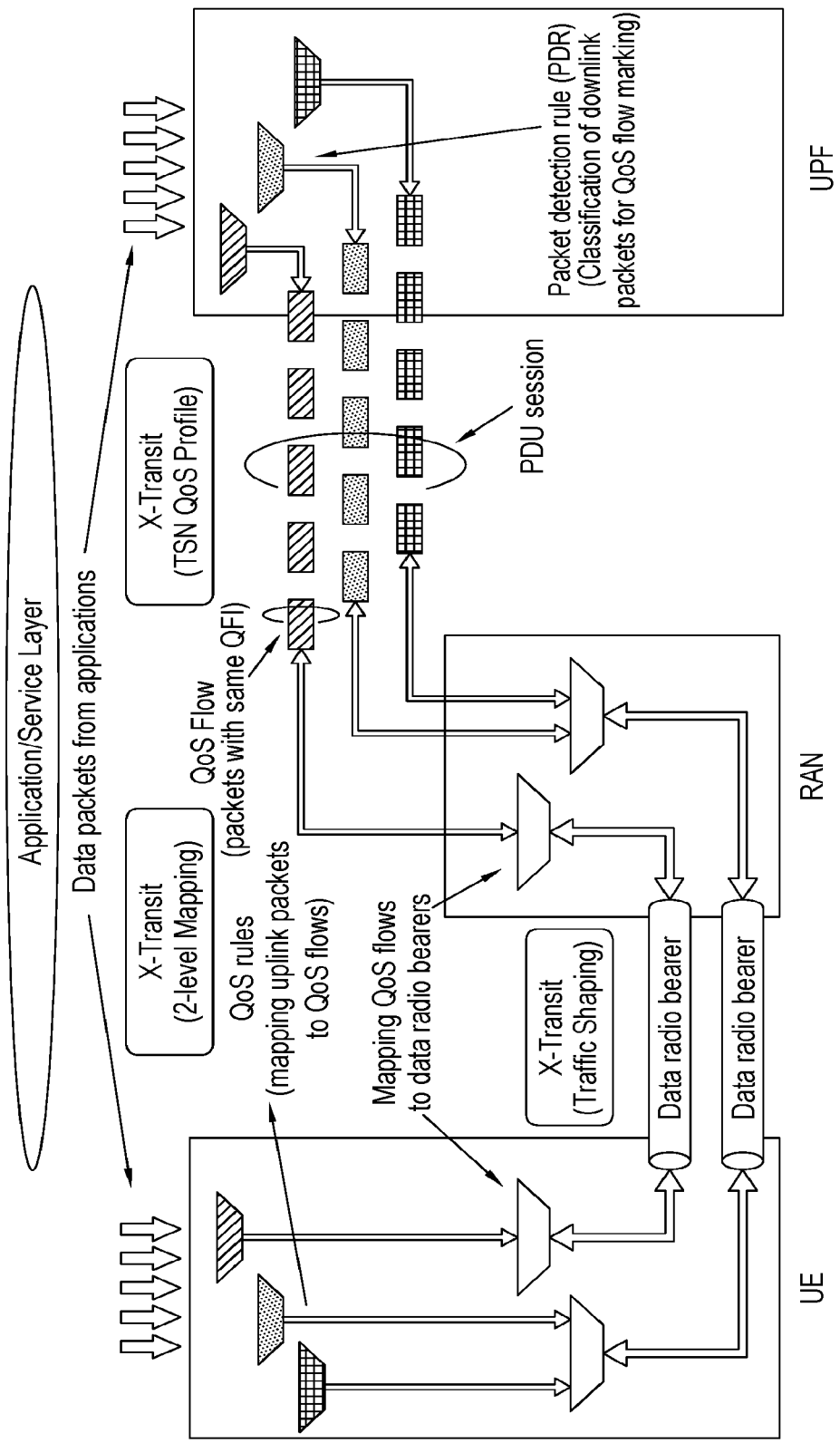
FIG. 14 shows the end-to-end flow of data using QoS flow control according to an arrangement.

FIG. 14 shows the end-to-end flow of data using QoS flow control according to an arrangement.

Uplink data is passed from the UE to the RAN via a data radio bearer. Multiple QoS flows may be combined, as discussed above, into transmission over a single DRB. The transmission over the DRB is then converted by the RAN back into independent QoS flows, which are passed to the User Profile Function (UPF) to be output. The user plane function passes the data to the TSN translator, which then outputs the data to the TSN Bridge on the network side.

A QoS flow is identified by a unique QoS flow ID (QFI). Each QoS flow is characterized by a QoS profile containing a number of QoS parameters. 5G RAN and 5G core network ensure QoS by mapping packets to appropriate QoS flows and DRBs. Unlike 4G, there is a one-to-many relationship between the GPRS Tunnelling Protocol for the user plane (GTP-U) tunnel on the N3 interface (connecting the gNodeB, gNB, and UPF) and the DRBs on the air-interface.

The QoS flow is the finest granularity for QoS differentiation of user-plane traffic. A PDU session provides connectivity between a UE and the external data network (via the User Plane Function, UPF, in 5G core network). 5G supports various types of PDU sessions including IPv4, IPv6 and Ethernet. A PDU session may contain multiple QoS flows and several DRBs but only a single GTP-U tunnel on the N3 interface.

Figure 15:
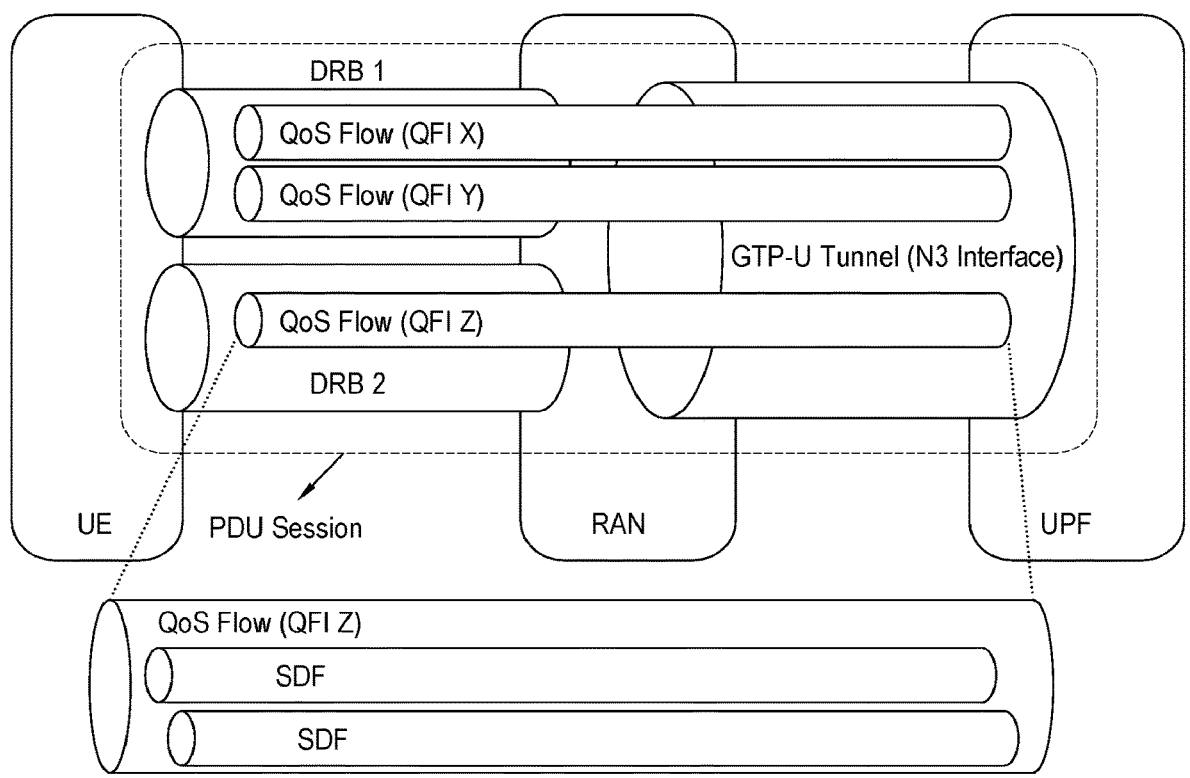
FIG. 15 shows the anatomy of a PDU session according to an arrangement.

FIG. 15 shows the anatomy of a PDU session according to an arrangement. A single PDU session is a logical connection between the UE and the UPF via the RAN. It consists of one or more connections (via corresponding DRBs) between the UE and the RAN, followed by a GTP-U tunnel (via the N3 interface). Accordingly, a PDU session may contain multiple data radio bearers (DRBs). Each DRB may include multiple QoS flows. The GTP-U may also contain multiple QoS flows. A QoS flow may consist of one or more service data flows (SDFs). The SDF is a stream of packets between a UE and an external data network (via the UPF). SDFs with similar requirements are aggregated into a QoS flow as depicted in FIG. 15.

FIG. 14 also illustrates TSN-centric enhancements to the 5G QoS model in the present arrangements. This includes the traffic shaping described above as well as 2-level mapping and a TSN QoS profile which shall now be described.

Figure 16:
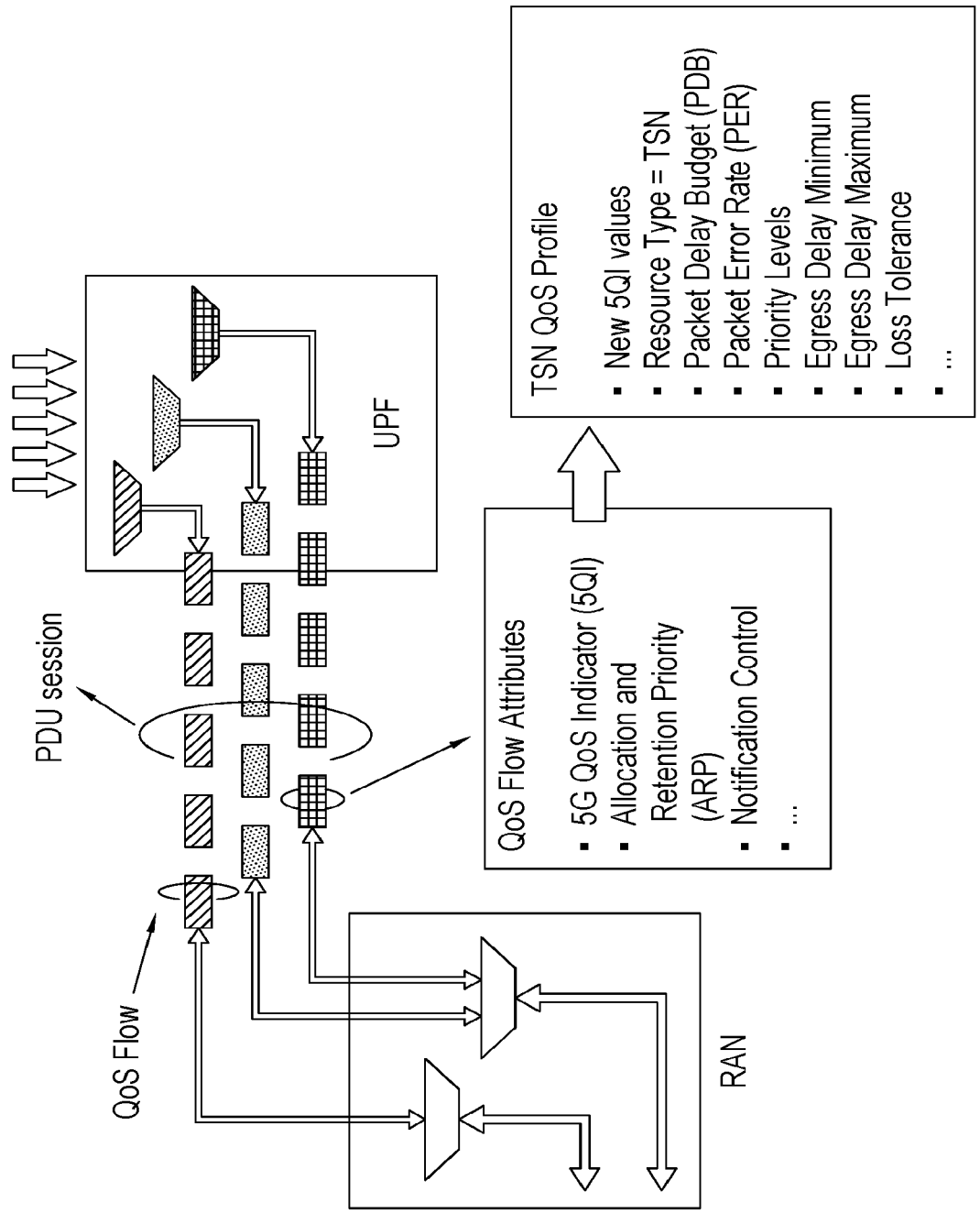
FIG. 16 shows features of the TSN QoS profile according to an arrangement.

FIG. 16 shows features of the TSN QoS profile according to an arrangement. The TSN QoS profile introduces a new resource type category for supporting applications that require deterministic QoS (ultra-low bounded latency, ultra-high reliability, minimal jitter, etc.). This is different from existing resource types like guaranteed bit rate (GBR) and non-GBR. Further, new 5G QoS values are defined to differentiate different types of applications carried by the TSN system. For example, critical applications like control and AVB have somewhat different performance requirements. The TSN QoS profile dictates packet forwarding treatment in the core network as well as the RAN, in order to fulfil the QoS requirements of TSN traffic (streams). It also ensures that the constraints imposed on the 5G system are fulfilled, in order to provide end-to-end performance guarantees in integrated deployments.

The TSN QoS profile also introduces new parameters. Two new latency-centric parameters have been defined in order to provide deterministic performance. As discussed above, the egress delay minimum parameter defines the earliest possible time instant at which a packet can arrive at the egress port relative to its arrival at the ingress port of the 5G system. The egress delay maximum parameter defines the latest possible time instant at which a packet can arrive at the egress port relative to its arrival at the ingress port of the TSN system. In addition to these, a loss tolerance parameter has been included, which is the number of successful packet losses that can be tolerated. If the latency requirements are not expected to be met, packets are dropped by the UE, gNB or the UPF only if the number of successive losses is less than the loss tolerance. Otherwise, packets are rescheduled with a higher priority.

2-level Mapping Algorithm—the present arrangements implement a unique 2-level mapping algorithm for transporting TSN traffic over a 5G system. The first level is the non-access stratum layer (NAS) level where TSN (and other) traffic streams are classified, marked and mapped to QoS flows. The second level is the AS level where QoS flows are mapped to the DRBs. We distinguish two cases for 2-level mapping. In the first case the TSN traffic ingress point is the UPF side. In the second case, the TSN traffic ingress point is the UE side.

Figure 17:
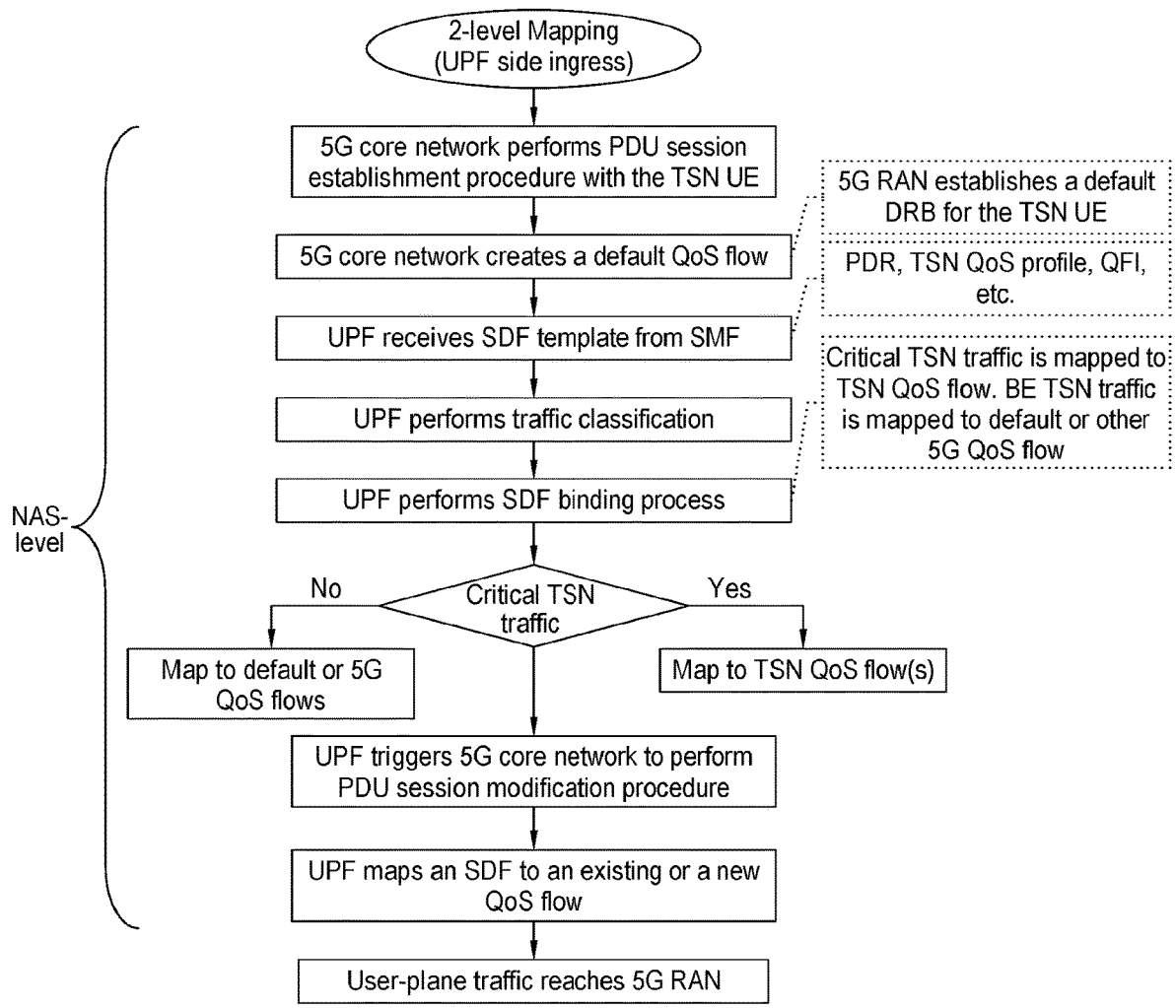
FIG. 17 shows a method for mapping data to QoS flows at the non-access stratum layer for data arriving into a 5G network at the User Plane Function side according to an arrangement.
Figure 18:
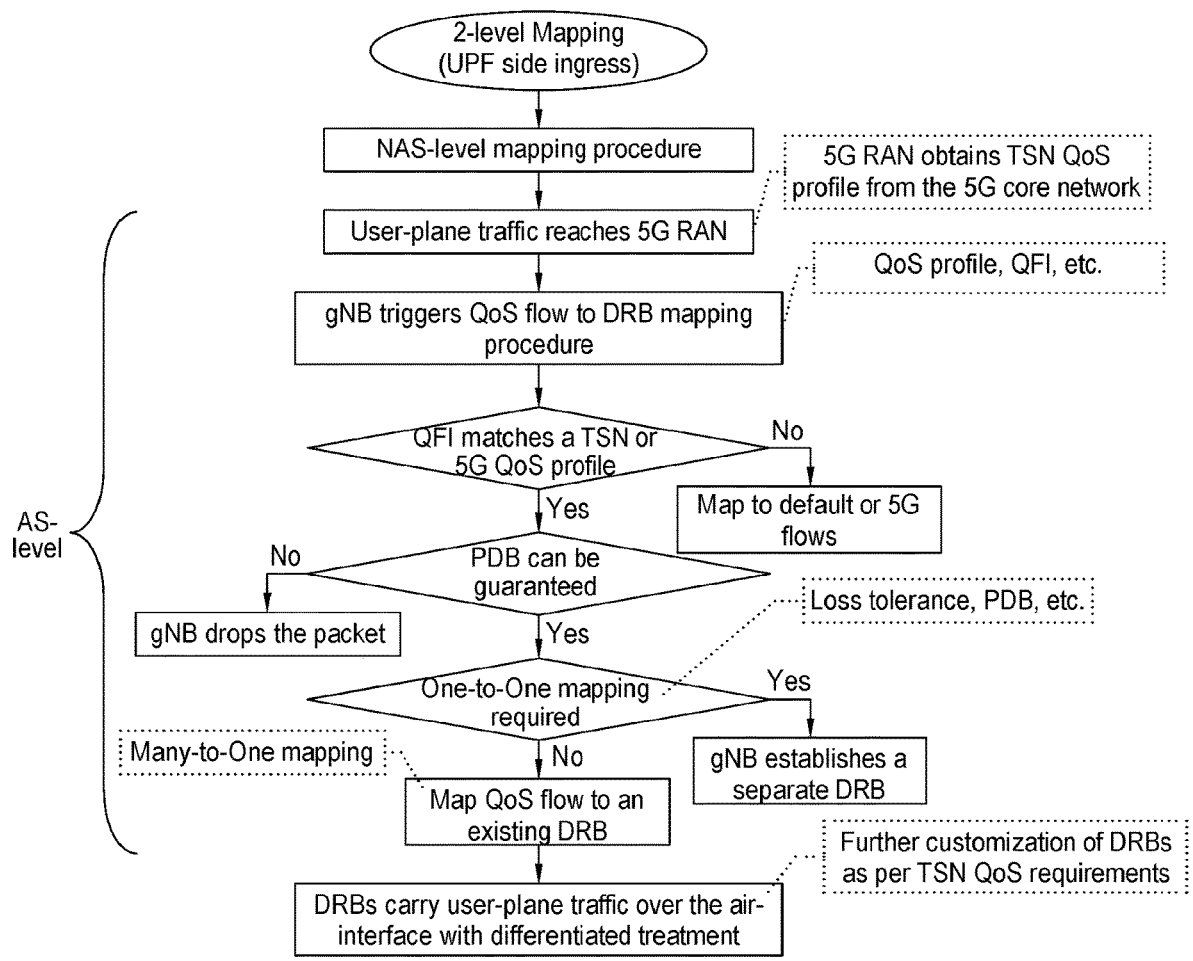
FIG. 18 shows a method for mapping QoS flows to Data Radio Bearers (DRBs) at the access stratum layer for data arriving into a 5G network at the User Plane Function side according to an arrangement.

The 2-level mapping algorithm for the UPF-side ingress case is shown in FIG. 17 and FIG. 18.

FIG. 17 shows a method for mapping data to QoS flows at the non-access stratum layer for data arriving into a 5G network at the User Plane Function side according to an arrangement.

Before transporting TSN traffic over the 5G system, the 5G core network performs a PDU session establishment procedure. The 5G core network creates a default QoS flow. The 5G RAN establishes a default DRB to extend the default QoS flow to the TSN UE. To create downlink QoS flows, the UPF receives an SDF template from the session management function (SMF). The SDF template contains a packet detection rule (PDR) and a TSN QoS profile (along with other 5G QoS profiles) among other information elements.

It performs an SDF binding process, which maps incoming traffic streams to QoS flows. Critical TSN traffic is mapped to one or more TSN QoS flows, which are defined by the TSN QoS profile. Best-effort TSN traffic is mapped to the default QoS flow or other 5G QoS flows.

After this, the UPF triggers the 5G core network to perform a PDU session modification procedure to either modify an existing QoS flow (binding one or more SDFs to the same QoS flow) or to create a new QoS flow. Multiple SDFs may be grouped into the same QoS flow if they have similar requirements (e.g. similar priorities).

Based on the QoS flows the user-plane traffic reaches the 5G RAN where the AS-level mapping is performed.

FIG. 18 shows a method for mapping QoS flows to Data Radio Bearers (DRBs) at the access stratum layer for data arriving into a 5G network at the User Plane Function side according to an arrangement.

Once the user-plane traffic reaches the 5G RAN, the gNB triggers a QoS flow to DRB mapping procedure. If the QoS Flow ID (QFI) of a packet does not match an existing TSN or 5G QoS profile, the gNB assigns it to the default DRB. Otherwise, it determines that the QoS flow is for a TSN or 5G QoS profile, and moves onto determining a DRB for this.

Moreover, the gNB drops the packet if the PDB cannot be guaranteed, i.e., if the remaining PDB is less than the minimum latency in the 5G RAN. That is, if the system (via the gNB) determines that the egress delay minimum and maximum times will not be met, and the packet delay budget (PDB) is less than a threshold PDB, the packet is dropped as the packet will not reach egress in time and there is sufficient budget to allow the dropped transmission. If the threshold PDB has already been exceeded, or if dropping the packet would cause the threshold to be exceeded, then a packet might be scheduled at a higher priority, potentially superseding previously scheduled packets that have a lower priority. This superseding might occur for higher priority (e.g. control) QoS flows, but may not be implemented for lower priority (e.g. best effort) QoS flows.

The gNB implements two different types of DRB mapping. A one-to-one QoS flow to DRB mapping is performed under certain conditions, e.g., if remaining PDB and/or loss tolerance for a QoS flow is critical. Otherwise, a many-to-one mapping is applied wherein a QoS flow is mapped to an existing DRB. The DRBs carry user-plane traffic over the air-interface. The DRBs can be further customized (based on QoS requirements) to provide differentiated treatment in the RAN.

Figure 19:
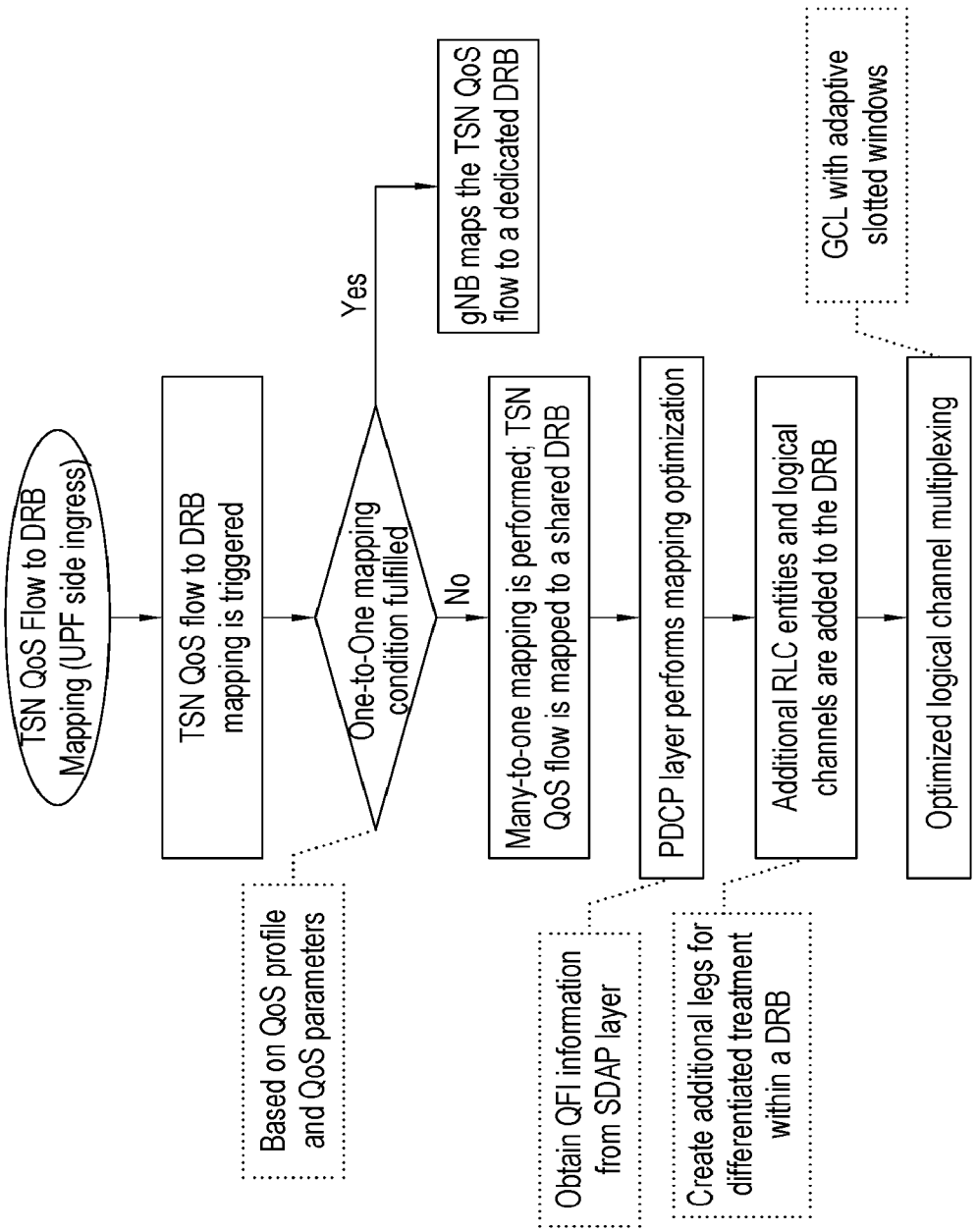
FIG. 19 shows a QoS flow to DRB mapping process for data arriving into a 5G network at the User Plane Function side according to an arrangement.

The QoS flow to DRB mapping is further explained through FIG. 19.

FIG. 19 shows a QoS flow to DRB mapping process for data arriving into a 5G network at the User Plane Function side according to an arrangement.

As discussed above, either one-to-one mapping or many-to-one mapping may be used. In some arrangements, the one-to-one QoS flow to DRB mapping is based on the priority level, the remaining PDB and the loss tolerance. The associated conditions are described as follows.

Dedicated DRB: If priority is high AND remaining PDB is not critical (i.e., above a certain threshold PDB_Thresh_Max) AND loss tolerance is high.

Dedicated DRB: If priority is high AND remaining PDB is critical (i.e., less than a certain threshold PDB_Thresh_Min) AND loss tolerance is high.

Dedicated DRB: If priority is high AND (remaining PDB is critical (i.e., less than a certain threshold PDB_Thresh_Min) OR loss tolerance is low).

Shared DRB: If priority is high AND remaining PDB is not critical (i.e., above a certain threshold PDB_Thresh_Max) AND loss tolerance is high.

Shared DRB: If priority is low.

Shared DRB: If priority is high AND a dedicated DRB cannot be established due resource limitations or any other factor.

In summary, one-to-one mapping may be performed if the priority is high and one or both of the following conditions are satisfied: the remaining PDB is below a PDB threshold; and a current number or proportion of lost packets for the QoS flow is above a loss threshold. Outside of these conditions, a shared DRB may be used. Importantly, as these parameters (e.g. packet loss, data budget) change over time, the mapping can be dynamically adapted over time as well.

The present arrangements provide additional customization if a high priority QoS flow is mapped to a shared DRB. The PDCP layer creates a bitmap based on QFI information (available from the SDAP layer). Based on the bitmap, the PDCP layer marks incoming traffic into 'critical' and 'non-critical' categories (although additional traffic categories can also be defined). Based on traffic categories, additional legs are created (i.e., other than the default leg). For each leg, an additional RLC entity and an additional logical channel is configured. Creation of legs provides the opportunity of differentiated treatment within the shared DRB.

Based on the logical channels for each leg, an optimized logical channel multiplexing takes place. The gNB derives a separate GCL for the shared DRB, which is handled in tandem with the GCLs for other DRBs. One option is to derive a two-level GCL with a GCE dedicated for each DRB at the first level and another GCL for the dedicated DRB. Each leg of the shared DRB is assigned a slotted window with adaptive duration, which is calculated as a fraction of the maximum duration based on the GCE for the shared DRB. This is illustrated in FIG. 20.

Figure 20:
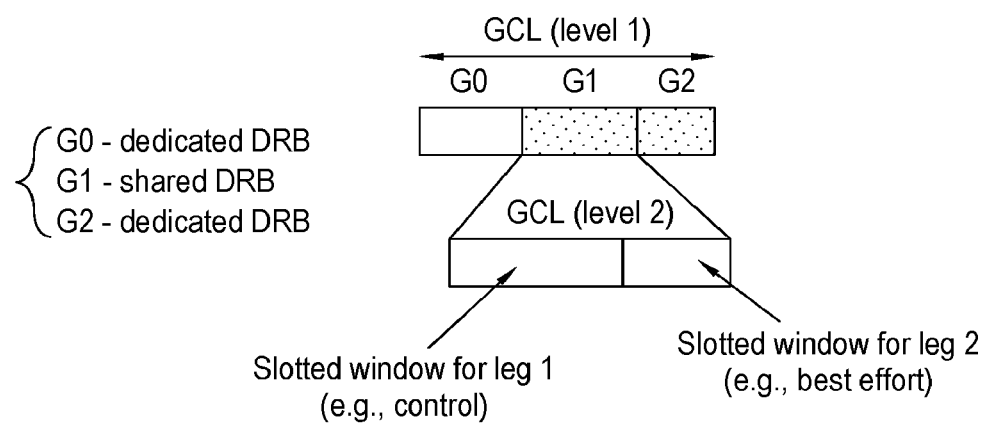
FIG. 20 shows a slotted window for a shared DRB according to an arrangement.

FIG. 20 shows a slotted window for a shared DRB according to an arrangement. As previously mentioned, the GCL defines windows of a predefined duration (GCEs). Each DRB is allocated a given window (GCE). For a dedicated DRB, the time slots are then allocated as described previously. Conversely, for a DRB that is shared between multiple QoS flows, the GCE for that DRB is divided into subwindows, with one subwindow allocated to each QoS flow for that DRB. The subwindows are defined by a second GCL. The size of each subwindow (each GCE within the second GCL) can vary, depending on the specific data requirements of the QoS.

Figure 21:
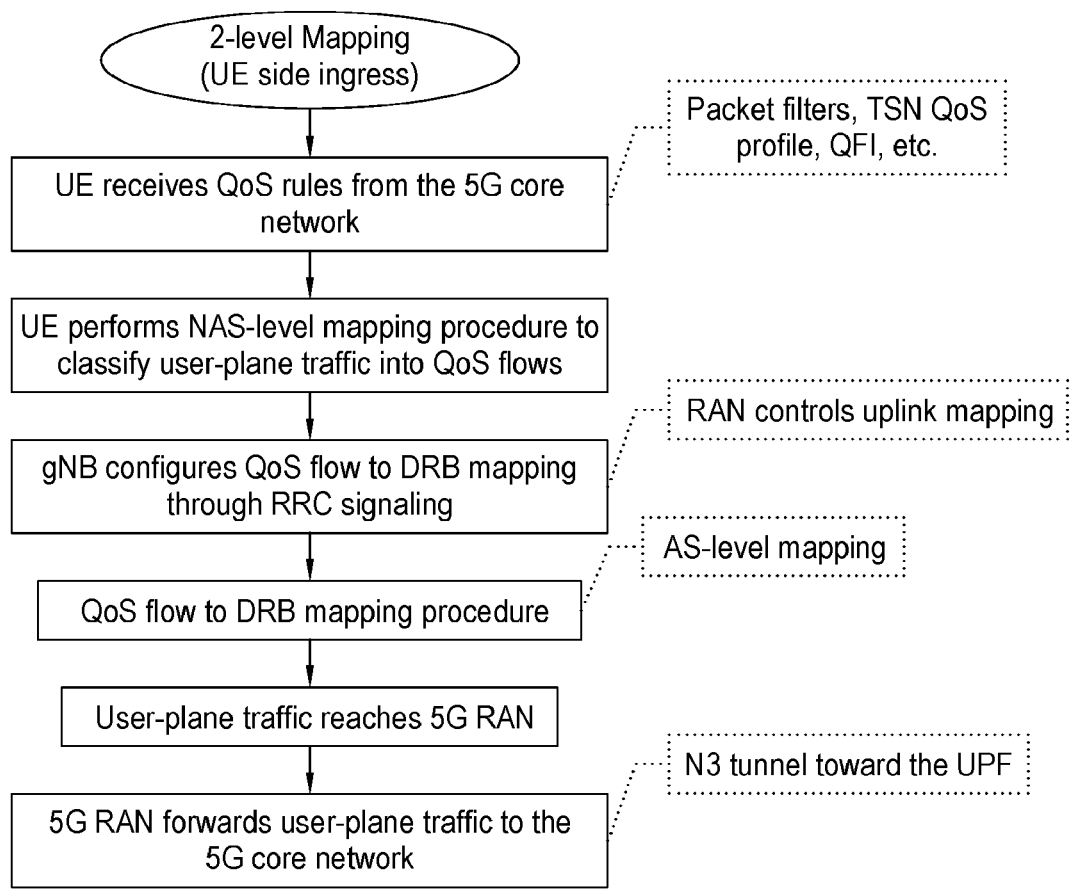
FIG. 21 shows a method for mapping data to DRBs for data arriving into a 5G network at the User Equipment side according to an arrangement.

Next, we describe the mapping algorithm for the case of UE side ingress with the aid of FIG. 21.

FIG. 21 shows a method for mapping data to DRBs for data arriving into a 5G network at the User Equipment side according to an arrangement. The UE uses QoS rules to classify user-plane traffic into QoS flows. The 5G core network provides QoS rules directly to the UE (through UE-SMF interface) or during PDU session establishment procedure. The QoS contains a packet filter and a TSN QoS profile among other information elements. Based on the QoS rules, the UE performs NAS-level mapping as described for the case of UPF side ingress (see FIG. 17). The gNB controls the mapping of QoS flows to the DRBs in the uplink. The gNB configures QoS flow to DRB mapping algorithm (as described for the case of UPF side ingress—see FIGS. 18 and 19) through RRC layer signalling. The user-plane traffic reaches the gNB through the DRBs. Further, the gNB forwards user-plane traffic to the 5G core network.

In effect, the NAS and AS-level mapping methodology for transmission in each direction is the same.

De-jittering Packet Buffers—the present arrangements provide an added layer of deterministic connectivity on an end-to-end basis through de-jittering packet buffers that are deployed at the edges of the network. Jitter is the deviation from periodicity of a periodic signal. Jitter can be caused by variability in end-to-end delay across the network. De-jittering is the process of reducing or removing the effects of jitter, e.g. by buffering the signal to reorder packets that have been delayed.

Figure 22:
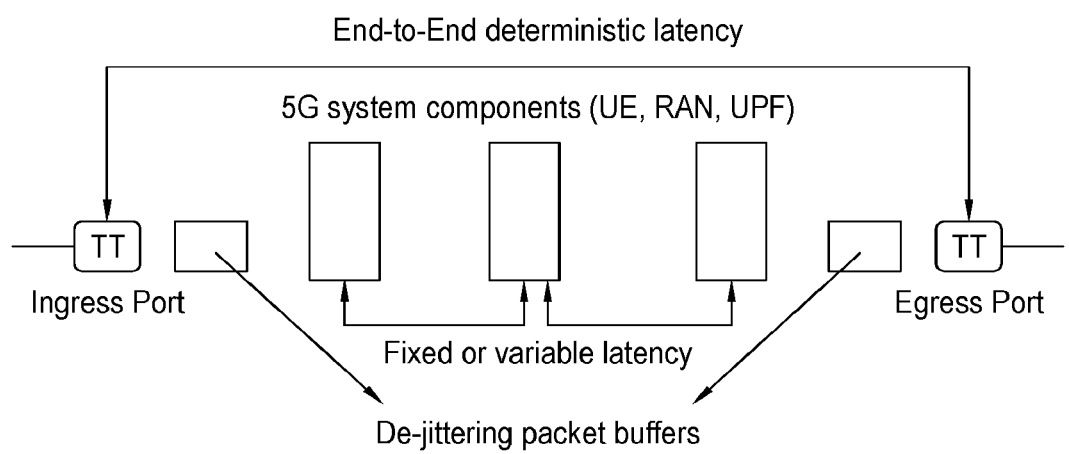
FIG. 22 shows the implementation of de-jittering packet buffers according to an arrangement.

FIG. 22 shows the implementation of de-jittering packet buffers according to an arrangement. If the ingress port is at the UE side, then the de-jittering packet buffer is located at the UPF. Similarly, if the ingress port is at the UPF side, then the de-jittering buffer is located at the UE side.

The de-jittering packet buffers provide end-to-end deterministic latency based on TSN-related QoS parameters and the variation of latency associated with the 5G system.

Figure 23:
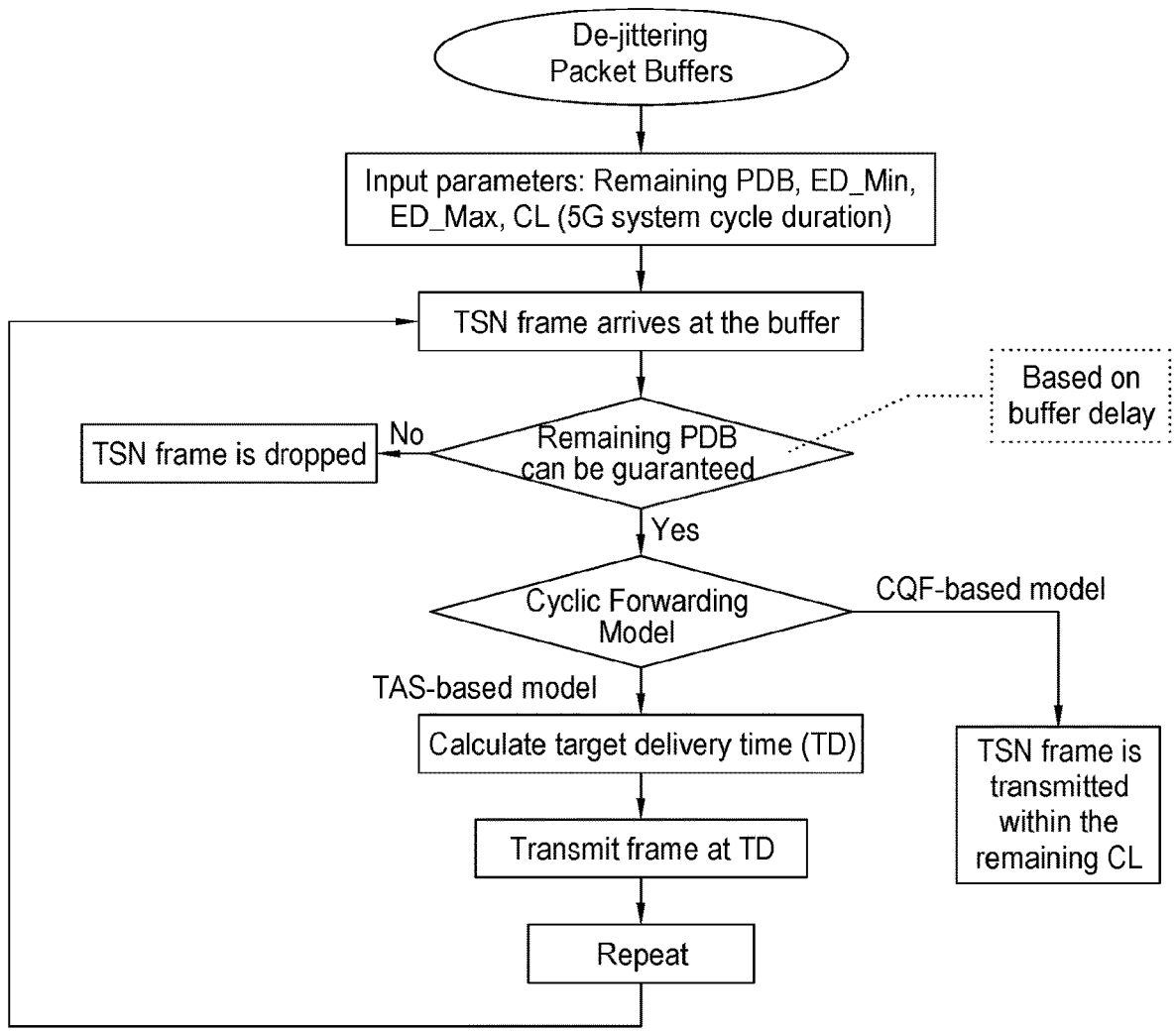
FIG. 23 shows a high-level protocol operation of de-jittering packet buffers according to an arrangement.

FIG. 23 shows a high-level protocol operation of de-jittering packet buffers according to an arrangement. The method receives as an input, the remaining PDB, the minimum egress delay (ED_Min), the maximum egress delay (ED_Max) and the cycle duration (CL) of the 5G system. When a TSN frame arrives at the de-jittering buffer, the method determines whether the remaining PDB can be guaranteed (e.g. based on the time required to output data and based on the remaining PDB). If this cannot be guaranteed (e.g. if the time for output would exceed the PDB) then the TSN frame is dropped.

If the remaining PDB can be guaranteed, then the method determines if what type of cyclic forwarding model is being used (see, for instance, FIG. 5). If a CQF-based model is being used, then the TSN frame is transmitted within the remaining CL. If a TAS-based model is being used, then the target delivery time (TD) is calculated and the frame is transmitted at the target delivery time.

In either case, once the frame has been dropped or transmitted, the method waits for the receipt of the next TSN frame and then repeats once the next TSN frame has been received.

UE-to-UE Time-Sensitive Communication Scenario

Figure 24:
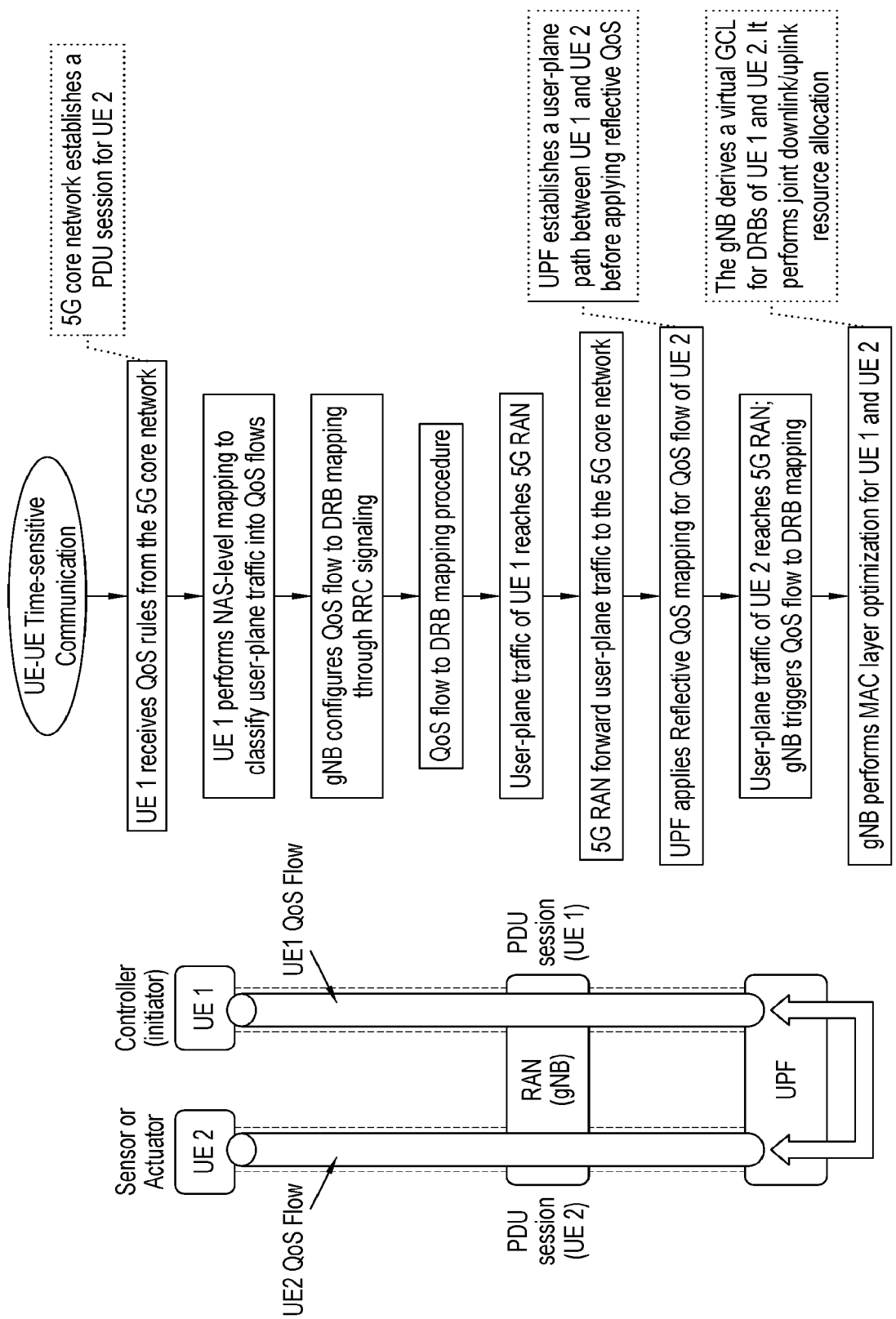
FIG. 24 shows a data connections and a method for exchanging time-sensitive information between two UEs via a 5G system according to an arrangement.

FIG. 24 shows a data connections and a method for exchanging time-sensitive information between two UEs via a 5G system according to an arrangement.

A specific scenario arises when two UEs connected to a 5G system are exchanging time-sensitive information (with or without a TSN system) with each other. We assume that the two UEs are served by a single gNB in the 5G RAN. The methodology described herein can be directly extended to this scenario for achieving end-to-end performance guarantees.

It is assumed that one of the UEs (UE 1) is the initiator (e.g., the controller). The other UE (UE 2) could be a sensor or an actuator. The time-sensitive communication could be uni-directional or bi-directional (e.g., closed-loop control). UE 1 initiates communication and follows the same procedure as described for UE side ingress. It is assumed that the 5G system has a priori information about UE 2. Therefore, the 5G core network establishes a default PDU session for UE 2.

UE 1 performs a NAS-level mapping (described previously) to classify time-sensitive traffic into TSN QoS flows. UE 1 performs AS-level mapping (described previously) to map QoS flows to DRBs. Once the user-plane traffic of UE 1 reaches the 5G core network, the UPF establishes a path between UE 1 and UE 2. The UPF performs a reflective QoS mapping, i.e., it monitors the QFI of packets in PDU session of UE 1 and applies the same QoS mapping for the packets in PDU session of UE 2. The user-plane traffic of UE 2 reaches the gNB, which performs a DRB to QoS flow mapping procedure. Note that the user-plane traffic for the two UEs is carried over different DRBs on the air-interface. The gNB performs a MAC layer optimization procedure. In case of bi-directional control, it derives a virtual GCL (based on traffic periodicity) and performs joint downlink/uplink resource allocation for the two UEs. Note that the two UEs can be served by two different gNBs in the 5G RAN as well. In this case, the two gNBs perform separate resource allocation.

Example Computer Implementation

Figure 25:
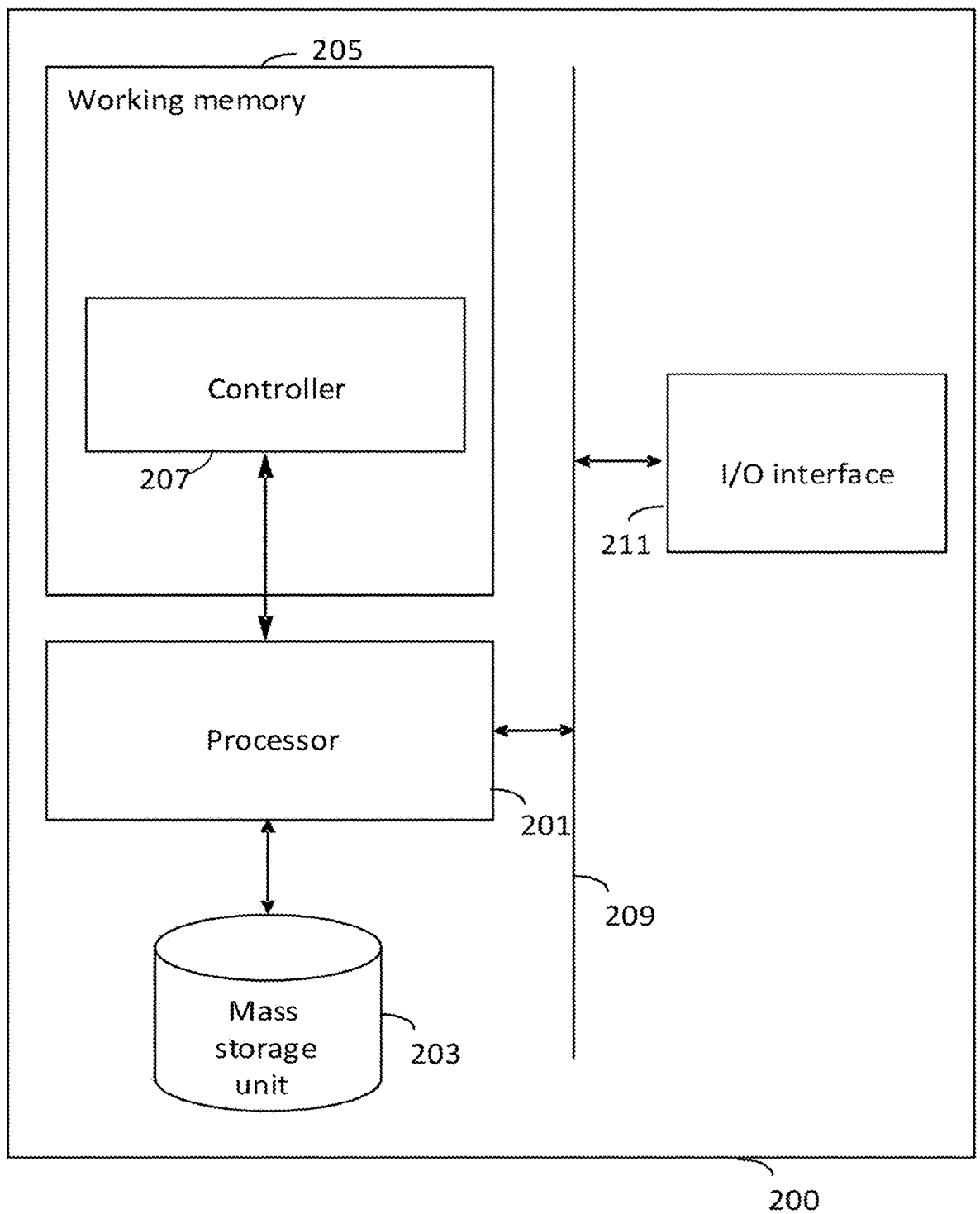
FIG. 25 shows an example of a computing system, which provides means capable of putting an implementation, as described herein, into effect.

FIG. 25 shows an example of a computing system, which provides means capable of putting an implementation, as described herein, into effect. Note that some of the methodology described herein is implemented across multiple computing devices.

As illustrated, the computing system 200 comprises a processor 201 coupled to a mass storage unit 203 and accessing a working memory 205. As illustrated, a controller 207 is represented as a software product stored in working memory 205. However, it will be appreciated that elements of the controller 207 may, for convenience, be stored in the mass storage unit 203.

Usual procedures for the loading of software into memory and the storage of data in the mass storage unit 203 apply. The processor 201 also accesses, via bus 209, a communications unit (input/output interface) 211.

Execution of the controller software by the processor 201 causes the methodology as described herein to be implemented. The controller software can be embedded in original equipment, or can be provided, as a whole or in part, after manufacture. For instance, the controller software can be introduced, as a whole, as a computer program product, which may be in the form of a download, or to be introduced via a computer program storage medium, such as an optical disk. Alternatively, modifications to an existing controller 207 can be made by an update, or plug-in, to provide features of the above described implementation.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made.

The invention claimed is:

1. A method comprising:
    receiving data for transmission from a first networking system at an ingress port of a wireless system, transmissions over the wireless system being scheduled, the wireless system forming a virtual bridge between the first networking system and a second networking system;
    classifying different portions of the data for transmission into different quality of service, QoS, data flows based on priority of the portions of the data, the QoS data flows corresponding to the data;
    dividing the QoS data flows into a first subset of one or more QoS data flows and a second subset of the one or more QoS data flows, allocating the first subset to a first virtual queue, the first virtual queue including first data for the first subset, and allocating the second subset to a second virtual queue, the second virtual queue including second data for the second subset;
    obtaining a schedule including a first window and a second window, wherein the first window provides permission to the first virtual queue to access and allocate first transmission resources for transmitting the first data in the first virtual queue, and the second window provides permission to the second virtual queue to access and allocate second transmission resources for transmitting the second data in the second virtual queue;

applying the schedule in order to allocate, for the first window, first transmission resources for the first virtual queue from a set of transmission resources, and allocate, for the second window, second transmission resources for the second virtual queue from the set of transmission resources; and transmitting the first data across the wireless system using the allocated first transmission resources and transmitting the second data across the wireless system using the allocated second transmission resources; and outputting the first data and the second data to the second networking system at an egress port of the wireless system.

2. The method of claim 1 wherein the first transmission resources and the second transmission resources are allocated such that transmission of one or more higher priority QoS data flows is prioritized over one or more lower priority QoS data flows.

3. The method of claim 1 wherein the first networking system, the second networking system and the wireless system are each one hop within a multi-hop network, transmission across the multi-hop network is scheduled in predefined cycles, wherein the set of transmission resources relates to a single cycle for one hop of transmission across the wireless system.

4. The method of claim 1 wherein the first transmission resources and the second transmission resources are selected from a set of timeslots over a predefined transmission cycle, and wherein transmission of one or more higher priority QoS data flows is prioritized over one or more lower priority QoS data flows by at least one of:

reserving a predefined group of one or more timeslots for the one or more higher priority QoS data flows; or allocating timeslots in order of priority.

5. The method of claim 1, wherein the first virtual queue is allocated to a corresponding first radio bearer for transmission, and the second virtual queue is allocated to a corresponding second radio bearer for transmission.

6. The method of claim 1 wherein a QoS data flow of the QoS data flows is allocated to a dedicated virtual queue in response the QoS data flow being a higher priority QoS data flow and at least one of the following conditions being satisfied:

an amount or proportion of lost packets for the QoS data flow exceeds a predefined packet loss; or a remaining transmission budget left for transmitting data within a predefined transmission window is less than a predefined transmission budget.

7. The method of claim 6 wherein the predefined packet loss or the predefined transmission budget varies depending on the priority of the QoS data flow.

8. The method of claim 1 wherein multiple QoS data flows are allocated to a shared virtual queue in response to each of the multiple QoS data flows being lower priority data flows.

9. The method of claim 1, wherein allocating, for the first window, the first transmission resources for the first virtual queue from the set of transmission resources, and allocating, for the second window, the second transmission resources for the second virtual queue from the set of transmission resources comprise:

forming a higher priority data unit reserved for a higher virtual queue and a lower priority data unit for a lower virtual queue:

scheduling transmission for the higher priority data unit in a first corresponding transmission window reserved for the higher priority virtual queue; and scheduling transmission for the lower priority data unit in a second corresponding transmission window, wherein the higher virtual queue is one of the first virtual queue and the second virtual queue, and the lower virtual queue is another of the first virtual queue and the second virtual queue.

10. The method of claim 9 wherein the lower priority data unit comprises data taken from a plurality of lower priority virtual queues.

11. The method of claim 10 wherein scheduling transmission for the lower priority data unit comprises, for the lower priority virtual queue, scheduling transmission for the lower priority data unit in the second corresponding transmission window reserved for the lower priority queue.

12. The method of claim 1 wherein allocating, for the first window, the first transmission resources for the first virtual queue from the set of transmission resources and allocating, for the second window, the second transmission resources for the second virtual queue from the set of transmission resources comprise:

forming a set of data units from the data in the first virtual queue and the second virtual queue;

for a data unit that contains higher priority data:

determining whether a predefined transmission budget is left within the set of transmission resources; and:

when the predefined transmission budget is left within the set of transmission resources, scheduling the data unit in a previously unallocated time window; and when the predefined transmission budget is not left within the set of transmission resources, scheduling the data unit in a prioritized time window that can pre-empt a previously scheduled transmission.

13. The method of claim 12 wherein allocating, for the first window, the first transmission resources for the first virtual queue from the set of transmission resources and allocating, for the second window, the second transmission resources for the second virtual queue from the set of transmission resources further comprise:

for another data unit that does not contain higher priority data, determining whether there is a previously unallocated time window and:

when there is a previously unallocated time window, scheduling the another data unit in the previously unallocated time window; and when there is not a previously unallocated time window, deferring transmission of the another data unit for a later set of transmission resources.

14. The method of claim 1 wherein a QoS data flow included in the QoS data flows is associated with a corresponding QoS profile that specifies one or more transmission parameters for the QoS data flow, wherein the one or more transmission parameters comprises at least one of:

an acceptable latency specifying a latest time that egress data can be received at the egress port to ensure that the egress data is output at the egress port by a predefined time; or a loss tolerance specifying a maximum number or proportion of lost packets for the corresponding QoS profile.

15. The method of claim 14 wherein:

the one or more transmission parameters comprises both the acceptable latency range and the loss tolerance; and the wireless system drops the transmission of a packet for a given QoS data flow in response to a latency of the packet falling outside of the acceptable latency range provided that a current number or proportion of lost packets for the given QoS data flow is within the loss tolerance for the QoS data flow.

16. The method of claim 15 wherein:
the one or more transmission parameters comprises both the acceptable latency range and the loss tolerance; and
the wireless system reschedules a packet with a higher priority in response to a latency of the packet falling outside of the acceptable latency range and a current number or proportion of lost packets for the given QoS data flow exceeding the loss tolerance for the QoS data flow.

17. The method of claim 1 wherein a packet buffer located at the egress port of the wireless system stores incoming packets and forwards the packets based on arrival time requirements at the egress port.

18. A wireless system comprising:
an ingress port configured to receive data for transmission from a first networking system, the wireless system forming a virtual bridge between the first networking system and a second networking system;
a wireless network configured to:
classify different portions of the data for transmission into different quality of service, QoS, data flows based on priority of the portions of the data, the QoS data flows corresponding to the data;
divide the QoS data flows into a first subset of one or more QoS data flows and a second subset of the one or more QoS data flows, allocating the first subset to a first virtual queue, the first virtual queue including first data for the first subset, and allocating the second subset to a second virtual queue, the second virtual queue including second data for the second subset:
obtain a schedule including a first window and a second window wherein the first window provides permission to the first virtual queue to access and allocate first transmission resources for transmitting the first data in the first virtual queue, and the second window provides permission to the second virtual queue to access and allocate second transmission resources for transmitting the second data in the second virtual queue;
apply the schedule in order to allocate, for the first window, first transmission resources for the first virtual queue from a set of transmission resources, and allocate, for the second window, second transmission resources for the second virtual queue from the set of transmission resources; and
transmit the first data across the wireless network using the allocated first transmission resources and transmit the second data across the wireless network using the allocated second transmission resources; and
an egress port configured to output the first data and the second data transmitted over the wireless network to the second networking system.

19. The wireless system of claim 18 wherein the wireless network comprises a mobile device, one or more base stations and a core network, wherein the mobile device and the one or more base stations are configured to communicate wirelessly with each other, and wherein the core network is configured to transfer data to and from the one or more base stations.

20. A device comprising a processor configured to:
receive data for transmission from a first networking system, transmissions over a wireless system being scheduled, the wireless system forming a virtual bridge between the first networking system and a second networking system;
classify different portions of the data for transmission into different quality of service, QoS, data flows based on priority of the portions of the data, the QoS data flows corresponding to the data;
divide the QoS data flows into a first subset of one or more QoS data flows and a second subset of the one or more QoS data flows, allocate the first subset to a first virtual queue, the first virtual queue including first data for the first subset, and allocate the second subset to a second virtual queue, the second virtual queue including second data for the second subset;
obtain a schedule including a first window and a second window wherein the first window provides permission to the first virtual queue to access and allocate first transmission resources for transmitting the first data in the first virtual queue, and the second window provides permission to the second virtual queue to access and allocate second transmission resources for transmitting the second data in the second virtual queue; and
apply the schedule in order to allocate, for the first window, first transmission resources for the first virtual queue from a set of transmission resources, and allocate, for the second window, second transmission resources for the second virtual queue from the set of transmission resources.

* * * * *